(12) United States Patent
Hori

(10) Patent No.: US 8,801,038 B2
(45) Date of Patent: Aug. 12, 2014

(54) TONGUE FOR SEAT BELT DEVICE, AND SEAT BELT DEVICE

(75) Inventor: Seiji Hori, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 109 days.

(21) Appl. No.: 13/606,191

(22) Filed: Sep. 7, 2012

(65) Prior Publication Data

US 2013/0062925 A1   Mar. 14, 2013

(30) Foreign Application Priority Data

Sep. 13, 2011   (JP) .................................. 2011-199899

(51) Int. Cl.
*B60R 22/12*   (2006.01)
*B60R 22/18*   (2006.01)
*B60R 22/00*   (2006.01)
*A44B 11/25*   (2006.01)

(52) U.S. Cl.
CPC ............. *A44B 11/2557* (2013.01); *B60R 22/18* (2013.01); *B60R 22/00* (2013.01)
USPC ........ 280/801.1; 297/468; 297/474; 297/475; 24/196; 24/593.1

(58) Field of Classification Search
CPC ........... A44B 11/2561; B60R 2022/46; B60R 2022/286; B60R 2022/289
USPC .......... 280/801.1; 297/468, 474, 475; 24/196, 24/593.1
See application file for complete search history.

(56) References Cited

U.S. PATENT DOCUMENTS

| | | | | |
|---|---|---|---|---|
| 5,050,274 A | * | 9/1991 | Staniszewski et al. | 24/171 |
| 5,058,244 A | * | 10/1991 | Fernandez | 24/170 |
| 5,100,176 A | * | 3/1992 | Ball et al. | 280/801.1 |
| 5,138,749 A | * | 8/1992 | McCune et al. | 24/196 |
| 5,417,455 A | * | 5/1995 | Drinane et al. | 280/808 |
| 5,471,717 A | * | 12/1995 | Ennerdal et al. | 24/633 |
| 5,649,341 A | * | 7/1997 | Ashline et al. | 24/171 |
| 5,806,148 A | * | 9/1998 | McFalls et al. | 24/168 |
| 5,870,816 A | * | 2/1999 | McFalls et al. | 29/434 |
| 7,010,836 B2 | * | 3/2006 | Acton et al. | 24/265 BC |
| 2004/0158955 A1 | * | 8/2004 | Acton et al. | 24/265 BC |

FOREIGN PATENT DOCUMENTS

JP   2009-525909   7/2009

* cited by examiner

*Primary Examiner* — Paul N Dickson
*Assistant Examiner* — Darlene P Condra
(74) *Attorney, Agent, or Firm* — Roberts Mlotkowski Safran & Cole P.C.

(57) ABSTRACT

A tongue for a seat belt device is provided with a tongue main body that is insertable within a buckle, and a train-around portion through which an intermediate portion of a webbing is inserted. The train-around portion includes a first shaft is fixedly mounted between a pair of opposing walls, and a second shaft that is movably mounted between the walls. The webbing is slidably bent 180° around the first fixed shaft. When tension of the webbing exceeds a predetermined magnitude or greater, the movable second shaft engages the webbing and increases a bending angle of the webbing around the first shaft to an angle greater than 180° thereby increasing frictional resistance between the webbing and the train-around portion.

6 Claims, 12 Drawing Sheets

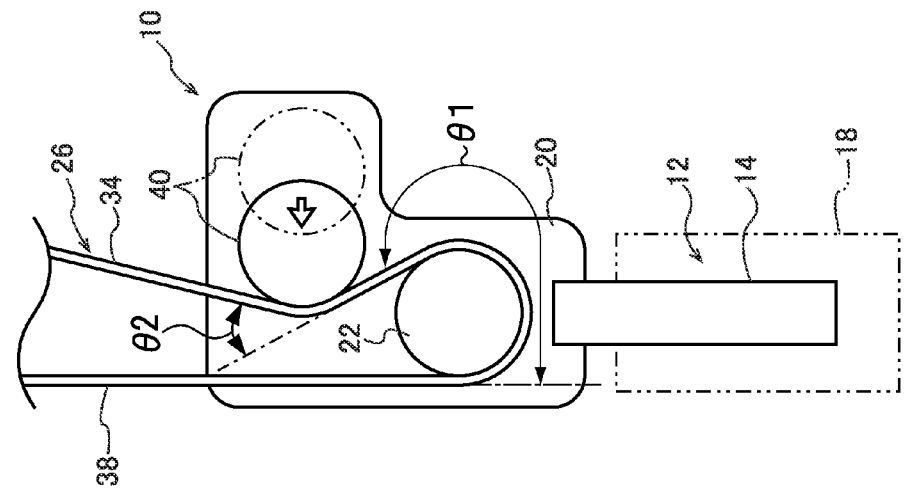
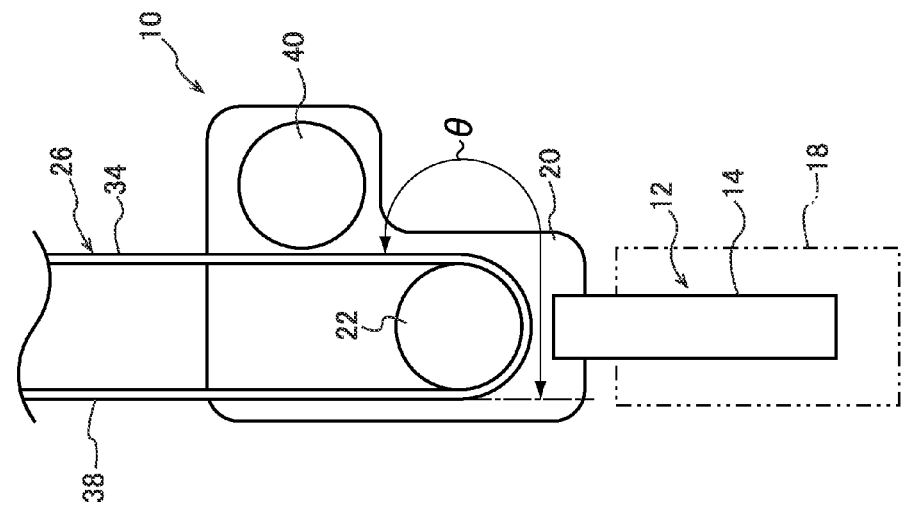

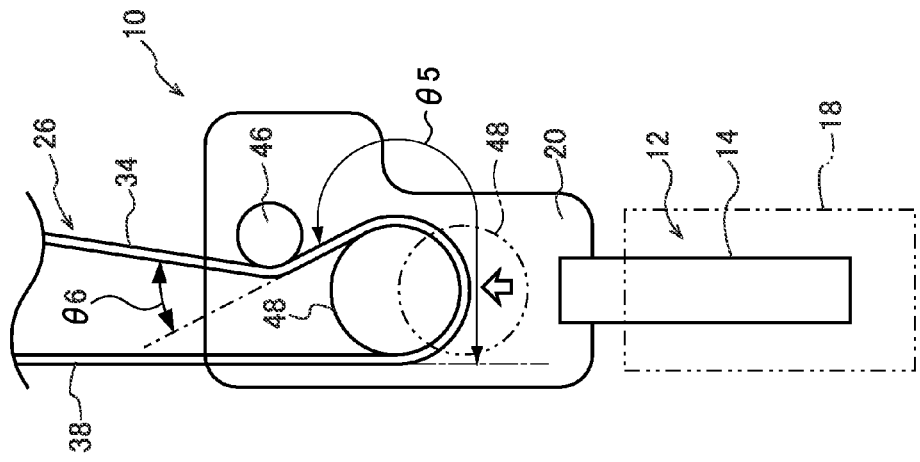
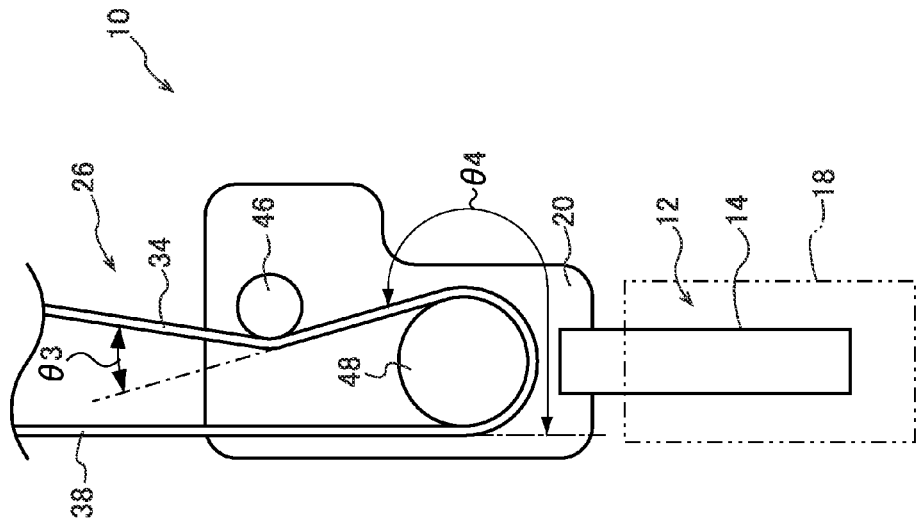

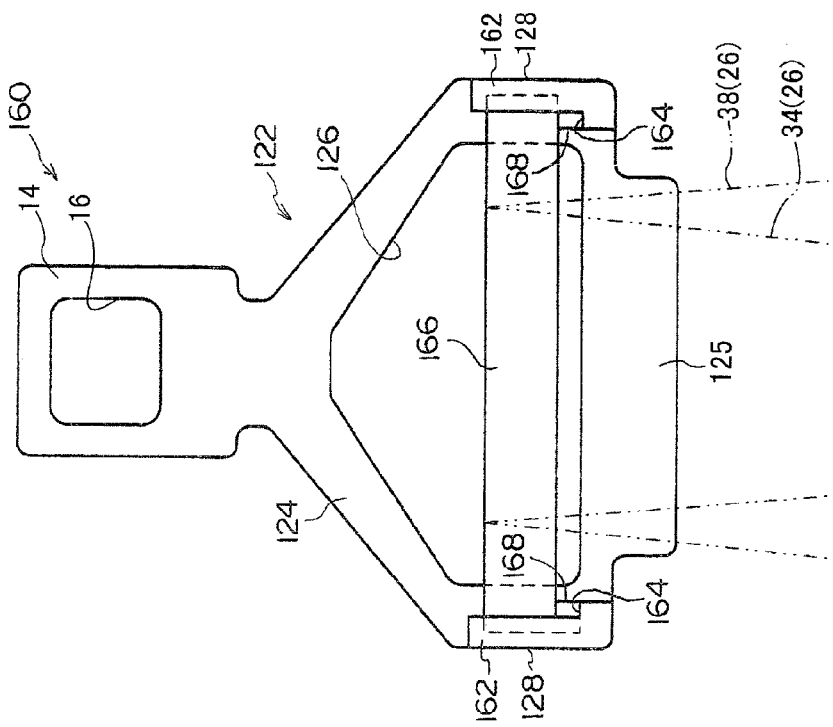
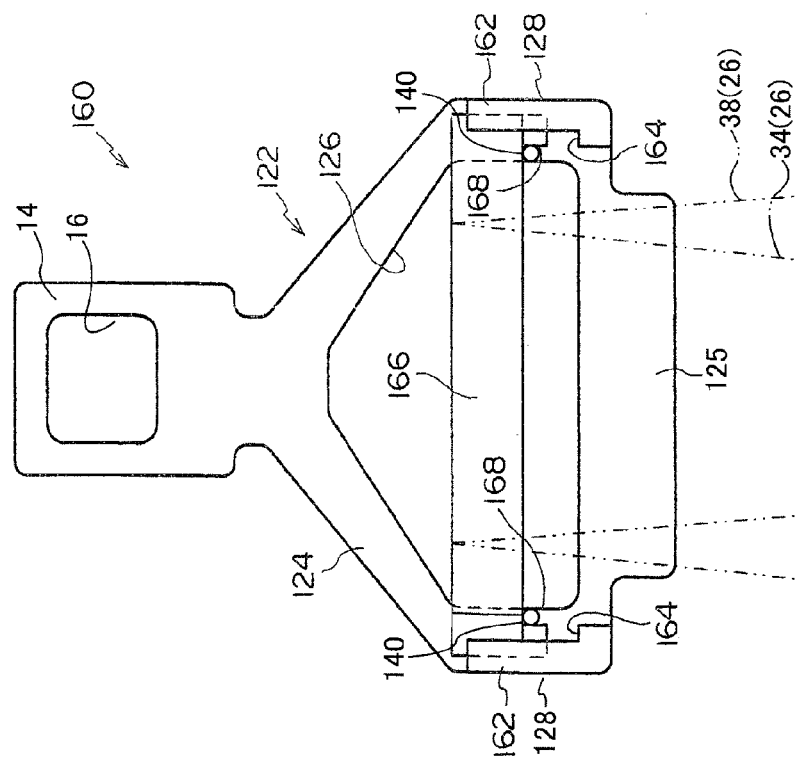

TONGUE FOR SEAT BELT DEVICE, AND SEAT BELT DEVICE

CROSS-REFERENCE TO RELATED APPLICATION

This application claims priority under 35 USC 119 from Japanese Patent Application No. 2011-199899 filed Sep. 13, 2011, the disclosure of which is incorporated by reference herein.

BACKGROUND OF THE INVENTION

1. Field of the Invention

The present invention relates to a tongue for a seat belt device that structures a seat belt device of a vehicle, and to a seat belt device that is equipped with this tongue.

2. Related Art

At a tongue for a seat belt device that is disclosed in Japanese Patent Application National Publication No. 2009-525909 (Patent Document 1) (this tongue is called the "belt tongue portion" in Patent Document 1), the main body portion thereof (called the "tongue portion main body portion" in Patent Document 1) is curved around an axis whose axial direction is the width direction of a webbing (called "belt webbing" in Patent Document 1), and a curved, plate-shaped bending-and-fastening element is provided at the inner side of this main body portion.

When, due to the vehicle rapidly decelerating, the body of the vehicle occupant pushes the webbing forward, and, due thereto, the tension of the webbing increases, the bending-and-fastening element slides along the inner side of the main body portion of the tongue due to this tension. The bending-and-fastening element that slides in this way pushes the webbing from a thickness direction one side thereof, and, due thereto, the bending-and-fastening element, together with an upper bar of the main body portion at the tongue, clamps the webbing. Due to the webbing being clamped in this way, the portion of the webbing, which portion is further toward the proximal end side than the tongue, moving further toward the distal end side than the tongue is suppressed.

However, when tension is applied to the webbing in the state in which the webbing is clamped, localized load is applied to the clamped portion at the webbing. Therefore, the webbing must be endowed in advance with strength that is able to withstand such load.

SUMMARY OF THE INVENTION

In consideration of the above-described circumstances, the present invention is to provide a tongue for a seat belt device and a seat belt device that can prevent or suppress movement of a webbing from a shoulder side to a lap side, and further, at which localized load is not applied to the webbing in this state in which movement is prevented or suppressed.

A tongue for a seat belt device relating to a first aspect of the present invention has: a tongue main body that is provided at an intermediate portion of a webbing in a longitudinal direction of the webbing, and at which the webbing is folded over in a state in which the tongue main body is inserted in a buckle; a train-around portion that is provided at the tongue main body, and at which the webbing is bent due to the webbing being trained therearound; and a bending angle increasing section that includes a movable portion provided so as to be apart from the train-around portion by more than a thickness dimension of the webbing, and that, in a case in which tension of the webbing is a predetermined magnitude or greater, moves the movable portion in a predetermined direction to cause the movable portion to push the webbing, and trains the webbing around the train-around portion and increases a bending angle of the webbing in a state in which the movable portion is apart from the train-around portion by more than the thickness dimension of the webbing.

In the tongue for a seat belt device relating to the first aspect of the present invention, for example, when a vehicle occupant who is seated in a seat, while pulling the tongue main body, places the webbing around his/her body and attaches the tongue main body to the buckle, there becomes a state in which the webbing is applied to the body of the vehicle occupant. In this state, the webbing is folded over at the tongue main body. The portion of the webbing, which portion is further toward the longitudinal direction proximal end side than this folded over portion, is the shoulder webbing and restrains the shoulder portion and the chest portion of the vehicle occupant. The portion of the webbing, which portion is further toward the longitudinal direction distal end side than the folded over portion, is the lap webbing and restrains the waist portion of the vehicle occupant.

On the other hand, for example, due to the vehicle rapidly decelerating, the body of the vehicle occupant attempts to inertially move toward the vehicle front side. When, due thereto, the tension of the webbing becomes greater than or equal to a predetermined magnitude, the movable portion of the bending angle increasing section is moved in a predetermined direction. The movable portion that has moved in this way pushes the webbing, and trains the webbing around the train-around portion that is provided at the tongue main body. Due to the webbing being trained-around the train-around portion in this way, the portion of the webbing, which portion is further toward the distal end side than the train-around portion, bends with respect to the proximal end side of the webbing. Due to the bending angle of the webbing increasing in this way, the frictional resistance between the train-around portion and the webbing increases. The webbing moving further toward the distal end side than the folded over portion of the webbing at the tongue main body, i.e., the length of the lap webbing increasing, can be prevented or suppressed.

Further, in the tongue for a seat belt device relating to the present invention, from the state before movement of the movable portion to after the end of the movement, the interval between the movable portion and the train-around portion is longer than the thickness dimension of the webbing. Therefore, the webbing is not clamped by the movable portion and the train-around portion. As a result, when movement of the webbing is prevented or suppressed, localized load being applied to the webbing can be prevented even more effectively.

Note that, in the present invention, it suffices for the train-around portion to be a structure around which the webbing is trained at least due to the webbing being pushed by the movable portion. Accordingly, the webbing does not have to be trained-around the train-around portion in the state before the movable portion moves. Further, even in a structure in which the webbing is trained-around the train-around portion and is bent in the state before the movable portion moves, it suffices for the train-around portion to be a structure in which, due to the movable portion moving, the webbing is further trained-around the train-around portion and the bending angle of the webbing increases.

Further, in the present invention, there may be a single or plural train-around portions. Moreover, this train-around portion may include the fold-over portion that is the portion at which the webbing is folded over at the tongue main body, and/or may include the movable portion of the bending angle increasing section.

In a tongue for a seat belt device relating to a second aspect of the present invention, the present invention relating to the first aspect has a restricting portion, the tongue further has a restricting portion that restricts movement of the movable portion in the predetermined direction by the restricting portion engaging with the movable portion that has moved in the predetermined direction with respect to the tongue main body, at a position at which a gap between the train-around portion and the movable portion is greater than or equal to the thickness dimension of the webbing.

In accordance with the tongue for a seat belt device relating to the second aspect of the present invention, when the tension of the webbing becomes greater than or equal to a predetermined magnitude, and, due thereto, the movable portion of the bending angle increasing section moves in a predetermined direction, the movable portion pushes the webbing. Further, when the movable portion moves in this way, the restricting portion engages with the movable portion. In the state in which the restricting portion is engaged with the movable portion, the interval between the movable portion and the train-around portion is in a state of being greater than or equal to the thickness of the webbing, and moreover, further movement of the movable portion in the predetermined direction is restricted. Accordingly, due to the restricting portion engaging with the movable portion, the interval between the movable portion and the train-around portion after the movable portion moves can be maintained in a state of being greater than or equal to the thickness of the webbing.

In the first aspect or the second aspect, it is possible that one of the train-around portion or the movable portion is a folded over portion at which the webbing is folded over, and the bending angle increasing section, in the case in which the tension of the webbing is the predetermined magnitude or greater, moves the movable portion in the predetermined direction such that a portion of the webbing at a side further toward a proximal end side than the folded over portion and a portion of the webbing at a side further toward a distal end side than the folded over portion approach or contact with each other in the vicinity of the folded over portion.

Further, it is possible that the movable portion is a folded over portion at which the webbing is folded over, and the movable portion is a slider member that can slide at the tongue main body.

Further, it is possible that the train-around portion is a folded over portion at which the webbing is folded over, and the movable portion is a rotating member that can rotate with respect to the tongue main body.

A seat belt device relating to a third aspect of the present invention has: a buckle that is provided at a side of a seat; a webbing that is shaped as an elongated strip; and a tongue that includes: a tongue main body that is provided at an intermediate portion of the webbing in a longitudinal direction of the webbing, and at which the webbing is folded over, the tongue main body being insertable into the buckle; a train-around portion that is provided at the tongue main body, and at which the webbing is bent due to the webbing being trained therearound; and a bending angle increasing section that includes a movable portion provided so as to be apart from the train-around portion by more than a thickness dimension of the webbing, and that, in a case in which tension of the webbing is a predetermined magnitude or greater, moves the movable portion in a predetermined direction to cause the movable portion to push the webbing, and trains the webbing around the train-around portion and increases a bending angle of the webbing in a state in which the movable portion is apart from the train-around portion by more than the thickness dimension of the webbing.

In the seat belt device relating to the third aspect of the present invention, for example, when a vehicle occupant who is seated in a seat, while pulling the tongue main body, places the webbing around his/her body and attaches the tongue main body to the buckle, there becomes a state in which the webbing is applied to the body of the vehicle occupant. In this state, the webbing is folded over at the tongue main body. The portion of the webbing, which portion is further toward the longitudinal direction proximal end side than this folded over portion, is the shoulder webbing and restrains the shoulder portion and the chest portion of the vehicle occupant. The portion of the webbing, which portion is further toward the longitudinal direction distal end side than the folded over portion, is the lap webbing and restrains the waist portion of the vehicle occupant.

On the other hand, for example, due to the vehicle rapidly decelerating, the body of the vehicle occupant attempts to inertially move toward the vehicle front side. When, due thereto, the tension of the webbing becomes greater than or equal to a predetermined magnitude, the bending angle increasing section moves the movable portion in a predetermined direction. The movable portion that has moved in this way pushes the webbing, and trains the webbing around the train-around portion that is provided at the tongue main body. Due to the webbing being trained-around the train-around portion in this way, the portion of the webbing, which portion is further toward the distal end side than the train-around portion, bends with respect to the proximal end side. Due to the bending angle of the webbing increasing in this way, the frictional resistance between the train-around portion and the webbing increases. The webbing moving further toward the distal end side than the folded over portion of the webbing at the tongue main body, i.e., the length of the lap webbing increasing, can be prevented or suppressed.

Further, in the seat belt device relating to the present invention, from the state before movement of the movable portion to after the end of the movement, the interval between the movable portion and the train-around portion is longer than the thickness dimension of the webbing. Therefore, the webbing is not clamped between the movable portion and the train-around portion. As a result, when movement of the webbing is prevented or suppressed, localized load being applied to the webbing can be prevented even more effectively.

Note that, in the present invention, it suffices for the train-around portion to be a structure around which the webbing is trained at least due to the webbing being pushed by the movable portion. Accordingly, the webbing does not have to be trained-around the train-around portion in the state before the movable portion moves. Further, even in a structure in which the webbing is trained-around the train-around portion and is bent in the state before the movable portion moves, it suffices for the train-around portion to be a structure in which, due to the movable portion moving, the webbing is further trained-around the train-around portion and the bending angle of the webbing increases.

Further, in the present invention, there may be a single or plural train-around portions. Moreover, this train-around portion may include the fold-over portion that is the portion at which the webbing is folded over at the tongue main body, and/or may include the movable portion of the bending angle increasing section.

As described above, in the tongue for a seat belt device and the seat belt device relating to the present invention, movement of the webbing from the shoulder side toward the lap side can be prevented or suppressed, and further, localized load is not applied to the webbing in a state in which such movement is prevented or suppressed.

BRIEF DESCRIPTION OF THE DRAWINGS

Embodiments of the invention will be described in detail with reference to the following figures, wherein:

FIGS. 1A and 1B are schematic side sectional views, with hatching omitted, of a tongue for a seat belt device relating to a first embodiment that is a basic embodiment, and FIG. 1A shows a state in which a webbing is applied, and FIG. 1B shows a state in which a bending angle increasing section is operated;

FIGS. 4A and 4B are sectional views corresponding to FIG. 1 and showing a modified example of the first embodiment that is a basic embodiment;

FIG. 6A shows a usual state, and FIG. 6B shows a state in which a bending angle increasing section operates and increases a bending angle of the webbing;

FIGS. 7A and 7B are plan views of a tongue for a seat belt device relating to a third embodiment, and FIG. 7A shows a usual state, and FIG. 7B shows a state in which a bending angle increasing section increases a bending angle of the webbing;

FIG. 8A shows a usual state, and FIG. 8B shows a state in which the bending angle increasing section increases the bending angle of the webbing;

FIG. 9A shows a usual state, and FIG. 9B shows a state in which a bending angle increasing section increases a bending angle of the webbing;

FIG. 10A shows a usual state, and FIG. 10B shows a state in which the bending angle increasing section increases the bending angle of the webbing;

FIG. 12A shows a usual state, and FIG. 12B shows a state in which a bending angle increasing section increases a bending angle of the webbing.

DETAILED DESCRIPTION OF THE INVENTION

Figure 2:
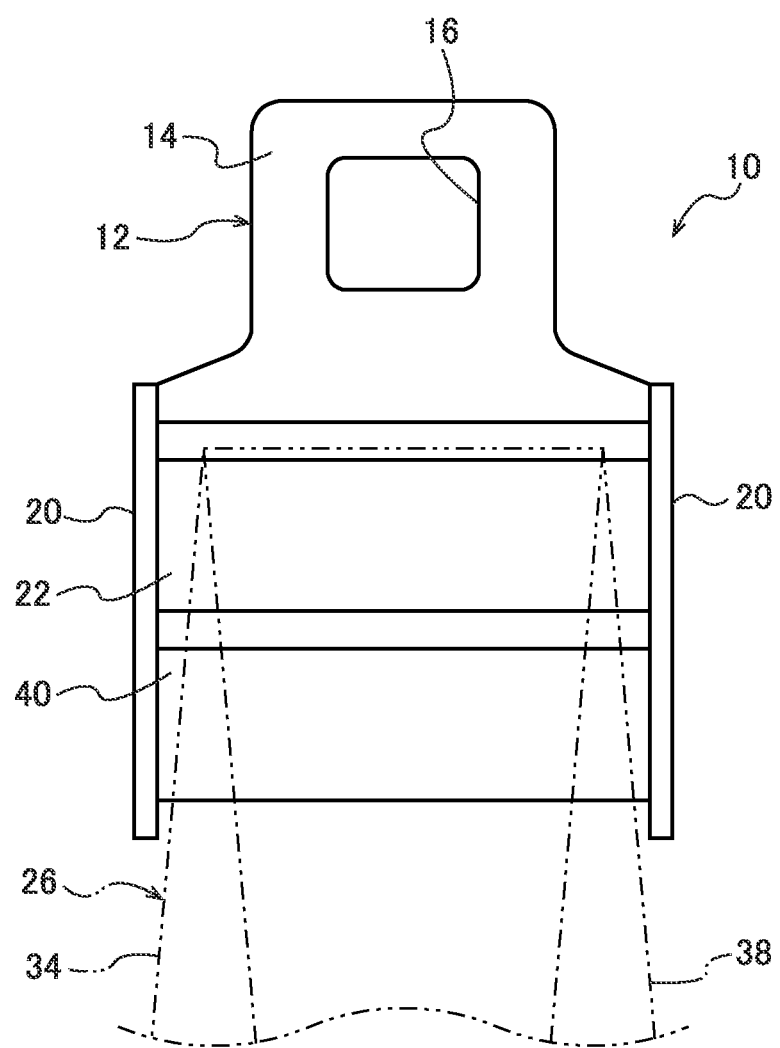
FIG. 2 is a schematic plan view of the tongue for a seat belt device relating to the first embodiment that is a basic embodiment.

Embodiments of the present invention are described next on the basis of the respective drawings of FIG. 1A through FIG. 12B. Note that, when explaining the following respective embodiments, regions, that are basically the same as those of embodiments and modified examples that were described before the embodiment or modified example that is being explained, are denoted by the same reference numerals, and detailed description thereof is omitted.

Further, among the following respective embodiments, the first embodiment is a basic embodiment for describing the principles, operation and effects of the present invention in an easily understood manner, and this basic embodiment is described with details of the structure omitted. Description that further concretizes this basic embodiment is given in the respective embodiments from the second embodiment on, and description is given hereinafter with the structures of the respective embodiments from the second embodiment on, and the structures of the first embodiment that is the basic embodiment, being set in correspondence with one another.

Structure of First Embodiment

Basic Embodiment

The structure of a tongue 10 for a seat belt device (hereinafter called tongue 10) relating to a first embodiment (basic embodiment) is shown in FIGS. 1A and 1B in a schematic front view (note that hatching of the cross-section is omitted from FIGS. 1A and 1B in order to make the structure and operation easy to understand). The structure of the tongue 10 is shown in FIG. 2 in a schematic side view. Further, the overall structure of a seat belt device 11 that includes the tongue 10 is shown in FIG. 3 in a schematic front view.

As shown in these drawings, the tongue 10 has a tongue main body 12. An insertion portion 14 that is flat-plate-shaped is formed at the tongue main body 12. As shown in FIG. 2, an engagement hole 16 is formed in the insertion portion 14. When the insertion portion 14 is inserted into a buckle 18 that is shown in FIG. 3, a latch provided within the buckle 18 engages with the engagement hole 16 so as to be inserted therein. Due thereto, there becomes a state in which the tongue 10 is attached to the buckle 18.

Further, a pair of supporting walls 20, that oppose one another in the width direction of the insertion portion 14, are provided at the tongue main body 12. A first shaft 22, that is a fold-over portion and serves as a train-around portion, is provided between these supporting walls 20. In the present embodiment that is a basic embodiment, the first shaft 22 is formed in a solid-cylindrical shape having a round cross-section, and the both ends thereof are fixed to the supporting walls 20. In the applied state of a webbing 26 to the body of a vehicle occupant 24 that is shown in FIG. 3, the webbing 26 is folded over at the first shaft 22 as shown in FIGS. 1A and 1B.

Figure 3:
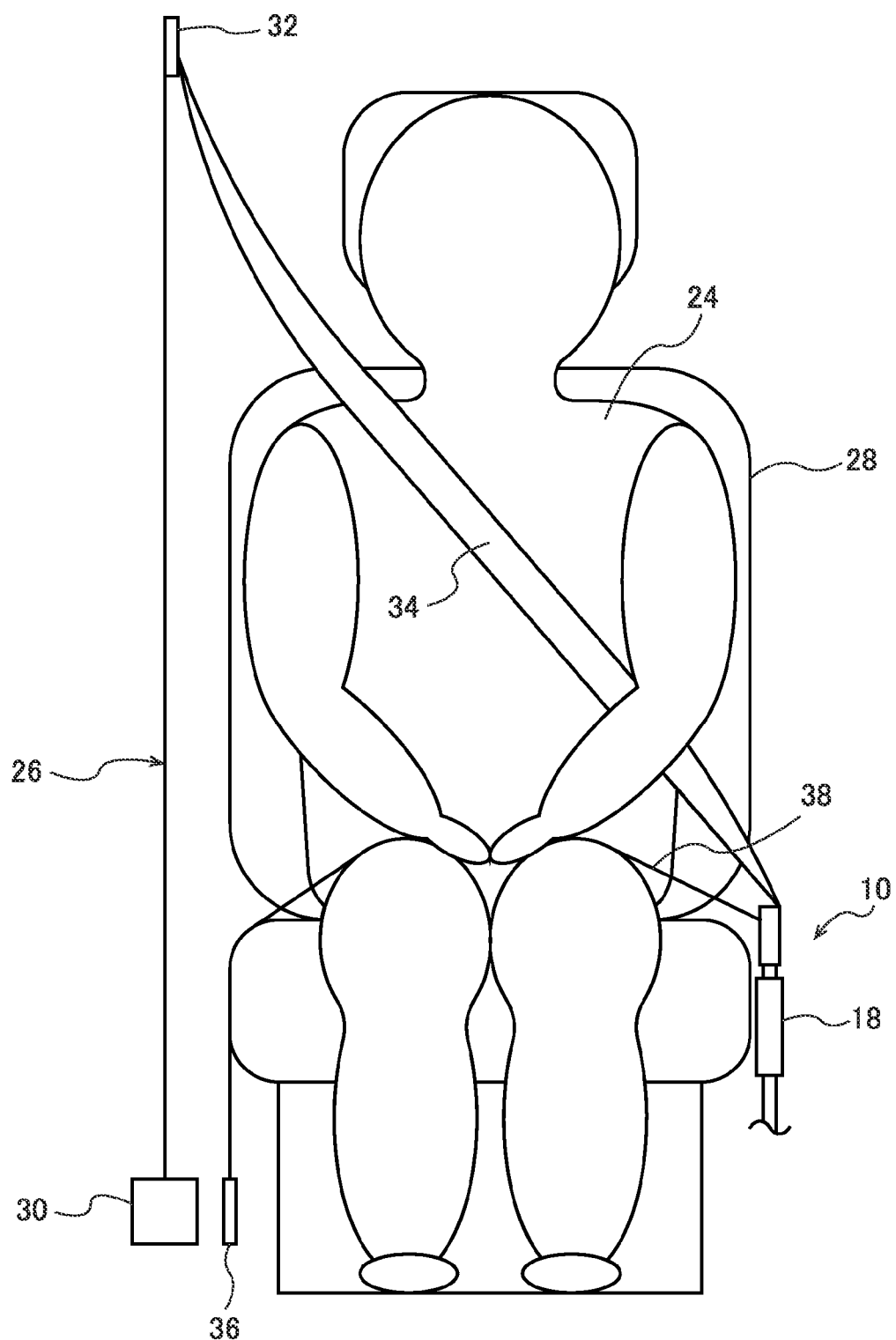
FIG. 3 is a drawing showing a summary of the overall structure of a seat belt device to which the tongue for a seat belt device relating to the first embodiment is applied, and a cross-section of the tongue for a seat belt device.

As shown in FIG. 3, a base (proximal) end side in the longitudinal direction of the webbing 26 is anchored on a spool of a webbing retractor 30 that is provided at the side of a seat 28 opposite the side at which the buckle 18 is provided. The webbing 26, that is pulled-out toward the upper side of the vehicle from the spool of this webbing retractor 30, is folded over downwardly at a shoulder anchor 32 that is provided, for example, in a vicinity of an upper end portion of a center pillar of the vehicle. At the webbing 26, the portion between the shoulder anchor 32 and the first shaft 22 of the tongue 10 is a shoulder webbing 34, and restrains the shoulder portion and the chest portion of the vehicle occupant 24.

In contrast, the portion of the webbing 26, which portion is further toward the tip (distal) end than the first shaft 22, is anchored to an anchor plate 36 that is fixed to the vehicle body at the side of the seat 28 opposite the side at which the buckle 18 is provided, or to a skeleton portion of the seat 28. At the webbing 26, the portion between the anchor plate 36 and the first shaft 22 of the tongue 10 is a lap webbing 38, and mainly restrains the waist portion of the vehicle occupant 24 from the front.

On the other hand, as shown in FIGS. 1A and 1B, a second shaft 40 that is a movable portion of a bending angle increasing section and that serves as a train-around portion, is provided between the both supporting walls 20 at the side of the first shaft 22 opposite the side at which the insertion portion 14 is provided. In this basic embodiment, the second shaft 40 is formed in a solid-cylindrical shape having a round cross-section. The second shaft 40 is provided at the side of the shoulder webbing 34 opposite the side at which the lap webbing 38 is provided, and further, the second shaft 40 is apart from the shoulder webbing 34 in an initial state.

This second shaft 40 can move in, for example, the thickness direction of the insertion portion 14. When the tension of the webbing 26 becomes greater than or equal to a predetermined magnitude, the second shaft 40 approaches the shoulder webbing 34 and pushes the shoulder webbing 34 toward the lap webbing 38 side. Further, as shown in FIGS. 1A and 1B, the second shaft 40 is provided such that the outer peripheral surface thereof is apart from the outer peripheral surface of the first shaft 22 by greater than or equal to the thickness of the webbing 26, and, even in the state in which the second shaft 40 is pushing the shoulder webbing 34, the position of the second shaft 40 is set such that the outer peripheral surface of the second shaft 40 is apart from the outer peripheral surface of the first shaft 22 by greater than or equal to the thickness of the webbing 26.

Note that, as described above, the present embodiment is a basic embodiment for easy understanding of the operation and effects thereof. Description of the structure for holding the second shaft 40 in the initial state, and of the concrete structure for operating the second shaft 40, are omitted here. The structure that concretizes the bending angle increasing section, that corresponds to the second shaft 40, is described from the second embodiment on.

Operation and Effects of First Embodiment

Basic Embodiment

Operation and effects of the present embodiment are described next.

At the present tongue 10, due to the tip end side of the insertion portion 14 being inserted into the buckle 18 and the latch of the buckle 18 engaging with the engagement hole 16, there becomes a state in which the tongue 10 is attached to the buckle 18. If, in this state, the webbing 26 is placed around the body of the vehicle occupant 24, there is a state in which the webbing 26 is applied to the body of the vehicle occupant 24, and the body of the vehicle occupant 24 is restrained by the webbing 26.

In this state, when the vehicle rapidly decelerates, the body of the vehicle occupant 24 attempts to move inertially toward the vehicle front side. In this case, the waist portion of the vehicle occupant 24 pushes the lap webbing 38 toward the vehicle front side, and the chest portion and the shoulder portion push the shoulder webbing 34 toward the vehicle front side. When the tension of the webbing 26 (the tension of the lap webbing 38 in particular) becomes greater than or equal to a predetermined magnitude due to the body of the vehicle occupant 24 pushing the webbing 26 in this way, the second shaft 40 operates to approach the shoulder webbing 34 along the thickness direction of the insertion portion 14 as shown in FIG. 1B.

When the second shaft 40 that approaches the shoulder webbing 34 press-contacts the shoulder webbing 34, the second shaft 40 pushes the shoulder webbing 34 toward the lap webbing 38 side. Due thereto, as shown in FIG. 1B, the shoulder webbing 34 is trained around the second shaft 40, and is trained around the first shaft 22 more so than in the state before the second shaft 40 operates (i.e., the state shown in FIG. 1A). Due thereto, the path of passage of the shoulder webbing 34 is changed.

Due to the shoulder webbing 34 being trained around the second shaft 40 in this way, the portion of the shoulder webbing 34, which portion is further toward the distal end side than the second shaft 40, bends around the central axis of the second shaft 40 at an angle of θ2 (hereinafter called bending angle θ2) with respect to the proximal end side relative to the second shaft 40. Further, due the webbing 26 being folded over at the first shaft 22, the portion further toward the distal end side than the first shaft 22 bends at an angle of θ (hereinafter called bending angle θ) with respect to the proximal end side relative to the first shaft 22. However, due to the shoulder webbing 34 being pushed by the second shaft 40 and the webbing 26 being further trained-around the first shaft 22, the portion further toward the distal end side than the first shaft 22 bends at an angle of θ1 (hereinafter called bending angle θ1), that is larger than the bending angle θ, with respect to the proximal end side relative to the first shaft 22.

In other words, a portion of the webbing which is further toward the proximal end side than the folded over portion (the first shaft 22) (a portion of the shoulder webbing 34) and a portion of the webbing which is further toward the distal end side than the folded over portion (a portion of the lap webbing 38) approach each other in the vicinity of the folded over portion (FIG. 1B).

Due to the bending angle of the portion of the webbing 26, which portion is further toward the distal end side than the proximal end side of the first shaft 22, being increased from θ to θ1, the frictional resistance between the first shaft 22 and the webbing 26 increases. Moreover, due to the bending θ2 increasing due to the shoulder webbing 34 being trained-around the second shaft 40 as described above, the frictional resistance between the second shaft 40 and the webbing 26 further increases. Due thereto, the portion of the webbing 26, which portion is further toward the distal end side of the webbing 26 than the first shaft 22, moving, i.e., the shoulder webbing 34 moving further toward the distal end side of the webbing 26 than the first shaft 22, so the length of the lap webbing 38 increasing, can be prevented or suppressed. By being able to prevent or suppress movement of the webbing 26 further toward the distal end side of the webbing 26 than the first shaft 22, the lap webbing 38 effectively restrains the waist portion of the vehicle occupant 24, and inertial movement of the vehicle occupant 24 toward the vehicle front side can be suppressed effectively.

Moreover, even in the state in which the second shaft 40 pushes the shoulder webbing 34, the outer peripheral surface of the second shaft 40 is apart from the outer peripheral surface of the first shaft 22 by greater than or equal to the thickness of the webbing 26. Therefore, the second shaft 40 merely press-contacts the shoulder webbing 34 (the webbing 26), and the webbing 26 is not clamped by the second shaft 40 and the first shaft 22. Thus, in the embodiment, a large load is not applied locally to the webbing 26, which is different in a structure in which the webbing 26 is clamped so the shoulder webbing 34 side moving toward the distal end side of the webbing 26 is suppressed.

Note that, in this basic embodiment, the first shaft 22 and the second shaft 40 are shaped as solid cylinders having round cross-sections, for ease of comprehension of the concept of the bending angle. However, the shapes of the sliding-contact portion and the bending angle increasing section are not limited to shapes that are round in cross-section such as those of the first shaft 22 and the second shaft 40, and these shapes may be non-round shapes such as polygonal or oval or the like.

Further, in this basic embodiment, the first shaft 22 that is the fold-over portion and the second shaft 40 that is the bending angle increasing section are structured as separate bodies. However, the present invention is not limited to such a structure.

For example, in a modified example shown in FIG. 4A, instead of the first shaft 22 and the second shaft 40, there are provided a first shaft 46 that serves as a train-around portion, and a second shaft 48 that is a fold-over portion, and is a movable portion of a bending angle increasing section, and further, serves as a train-around portion. The axial direction both ends of the first shaft 46 are fixed to the supporting walls 20, and the shoulder webbing 34 (the webbing 26) is trained around the first shaft 46 in the state in which the webbing 26 is applied to the body of the vehicle occupant 24. In the state in which the webbing 26 is applied to the body of the vehicle occupant 24, the portion of the shoulder webbing 34, which portion is further toward the distal end side than the first shaft 46, bends at an angle of θ3 (hereinafter called bending angle θ3) with respect to the proximal end side relative to the first shaft 46.

On the other hand, in the state in which the webbing 26 is applied to the body of the vehicle occupant 24, the webbing 26 is trained-around and folded over at the second shaft 48 that is provided further toward the insertion portion 14 side than the first shaft 46, and the portion of the webbing 26 further toward the proximal end side than the second shaft 48 is the shoulder webbing 34, and the distal end side is the lap webbing 38. This second shaft 48 is structured such that, when the tension of the webbing 26 becomes greater than or equal to a given magnitude, as shown in FIG. 4B, the second shaft 48 moves away from the insertion portion 14 and approaches the first shaft 46. In the state in which the webbing 26 is applied to the body of the vehicle occupant 24, the portion of the webbing 26, which portion is further toward the distal end side than the second shaft 48, bends at an angle of θ4 (hereinafter called bending angle θ4) with respect to the proximal end side relative to the second shaft 48.

When the tension of the webbing 26 becomes greater than or equal to a given magnitude and the second shaft 48 moves toward the first shaft 46 side, as shown in FIG. 4B, the portion of the webbing 26, which portion is further toward the distal end side than the second shaft 48, bends, with respect to the proximal end side relative to the second shaft 48, at an angle of θ5 (hereinafter called bending angle θ5) that is greater than the bending angle θ4. Further, due to the second shaft 48 moving toward the first shaft 46 side, the shoulder webbing 34 (the webbing 26) is trained further around the first shaft 46.

Due thereto, the portion of the shoulder webbing 34, which portion is further toward the distal end side than the first shaft 46, bends, with respect to the proximal end side relative to the first shaft 46, at an angle of θ6 (hereinafter called bending angle θ6) that is greater than the bending angle θ3. In this way, the total sum (bending angle θ5+bending angle θ6) of the bending angles of the webbing 26 after the tension of the webbing 26 increases and the second shaft 48 operates increases to more than the total sum (bending angle θ3+bending angle θ4) of the bending angles of the webbing 26 before the second shaft 48 operates. In this way, this modified example as well exhibits operation that is similar to and achieves effects that are similar to those of the above-described first embodiment that is the basic embodiment.

Structure of Second Embodiment

A second embodiment is described next.

Figure 5A:
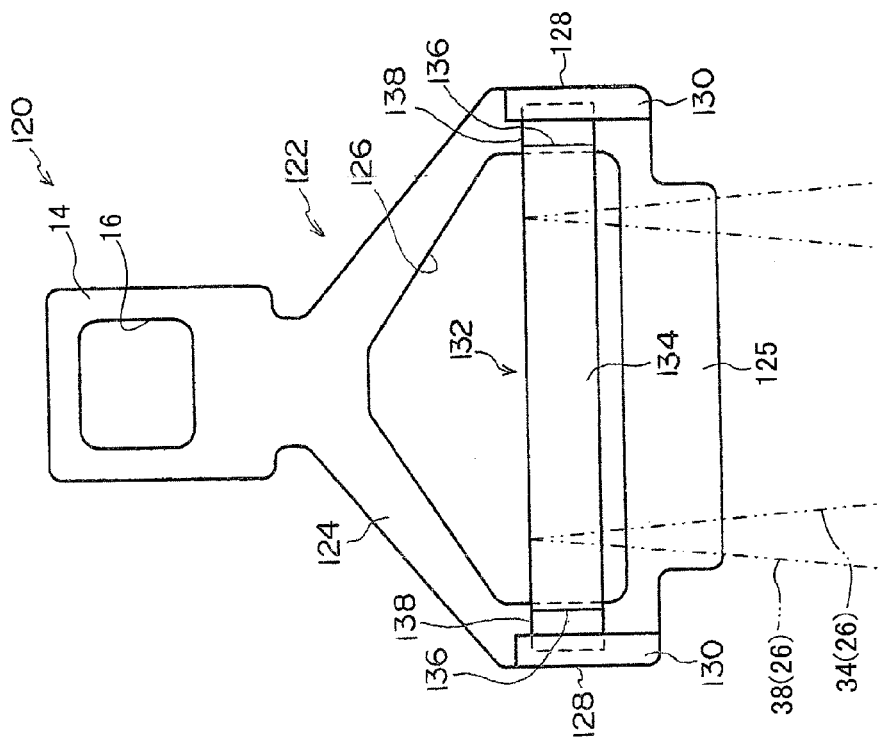
FIGS. 5A and 5B are perspective views of a tongue for a seat belt device relating to a second embodiment.
Figure 5B:
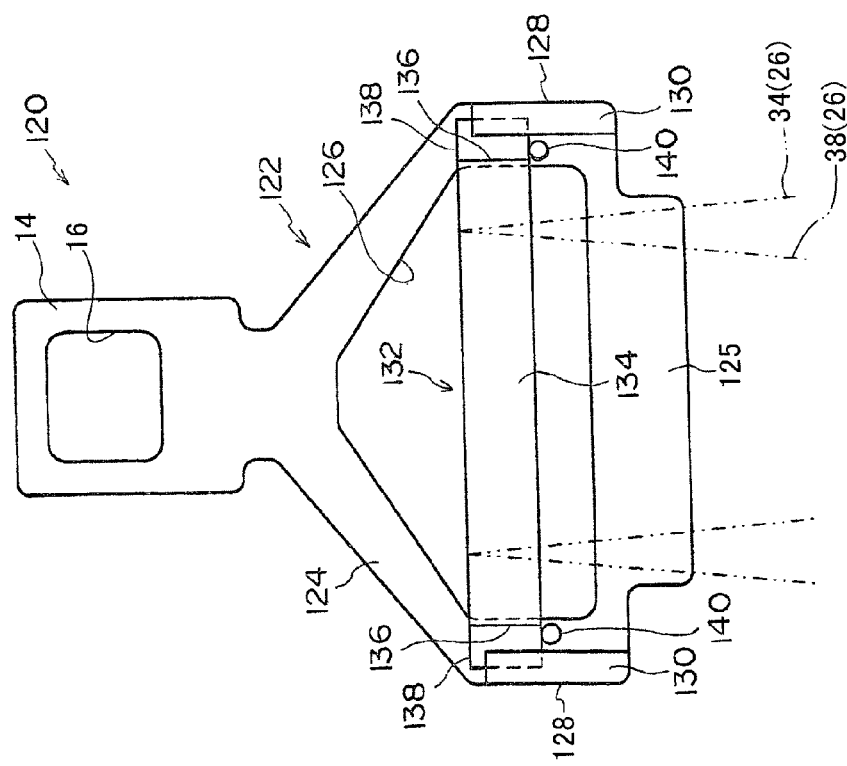

The overall structure of a tongue 120 for a seat belt device (hereinafter called tongue 120), that is the structure of the main portion of a seat belt device 121 relating to the present embodiment, is shown in FIGS. 5A and 5B in side views that correspond to FIG. 2. The structure of the tongue 120 is shown in sectional views in FIGS. 6A and 6B.

As shown in these drawings, the tongue 120 has a tongue main body 122 that is formed by the punching-out and bending-molding of a metal flat plate. The tongue main body 122 has the insertion portion 14. A base portion 124 is formed in continuation from the proximal end portion of the insertion portion 14. The base portion 124 is shaped as a rectangular (trapezoidal) flat plate whose width dimension is sufficient longer than width dimension of the insertion portion 14. A through-hole 126 is formed in the base portion 124.

The opening dimension of the through-hole 126, along the width direction of the base portion 124 and at the portion of the through-hole 126 that is at the side opposite the insertion portion 14, is set to be larger than the width dimension of the webbing 26, and the webbing 26 can pass through the through-hole 126. The portion of the base portion 124, which portion is at the side of the through-hole 126 opposite the side at which the insertion portion 14 is provided, is a train-around portion 125, and the webbing 26 is trained around the train-around portion 125 as described later. Moreover, vertical wall portions 128 are provided so as to stand from the width direction both end portions of the base portion 124 toward one side in the thickness direction of the base portion 124. Top wall portions 130 extend from the distal (tip) ends of these vertical wall portions 128 (the end portions of the vertical wall portions 128 at the side opposite the base portion 124) toward the width direction inner side of the base portion 124.

On the other hand, the present tongue 120 has a slider 132 that is a fold-over portion, and is a train-around portion, and also serves as a movable portion that structures a bending angle increasing section. The slider 132 has a slider main body 134. The slider main body 134 is formed in the shape of a plate that has a thin width and whose longitudinal direction is along the longitudinal direction of the base portion 124. The longitudinal dimension of the slider main body 134 is set to be shorter than the interval between the one top wall portion 130 and the other top wall portion 130, and is set to be longer than the opening width dimension of the through-hole 126.

Leg plates 136 extend from the longitudinal direction both end portions of the slider main body 134 toward the base portion 124 side along the thickness direction of the slider main body 134. Pushing pieces 138 extend from the end portions of the leg plates 136 at the side opposite the slider main body 134, toward the outer sides in the longitudinal direction of the slider main body 134. The thickness dimension of the pushing pieces 138 is slightly smaller than the interval between the top wall portions 130 and the base portion 124, and the pushing plates 138 enter-in between the top wall portions 130 and the base portion 124.

Due thereto, the slider 132 is guided by the vertical wall portions 128 and the top wall portions 130 and can slide toward the distal end side or the proximal end side of the present tongue 120. Further, the shape and the like of the leg plates 136 are set such that, in the state in which the pushing pieces 138 have entered in between the top wall portions 130 and the base portion 124, the interval between the surface of the base portion 124, including the train-around portion 125, at the slider 132 side, and the surface of the slider main body 134 at the base portion 124 side, is greater than the thickness of the webbing 26.

Figure 6A:
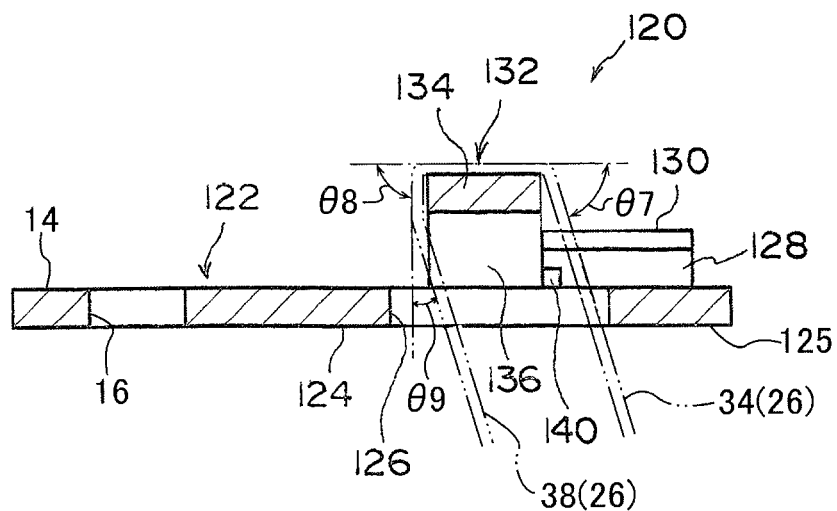
FIGS. 6A and 6B are sectional views of the tongue for a seat belt device relating to the second embodiment.
Figure 6B:
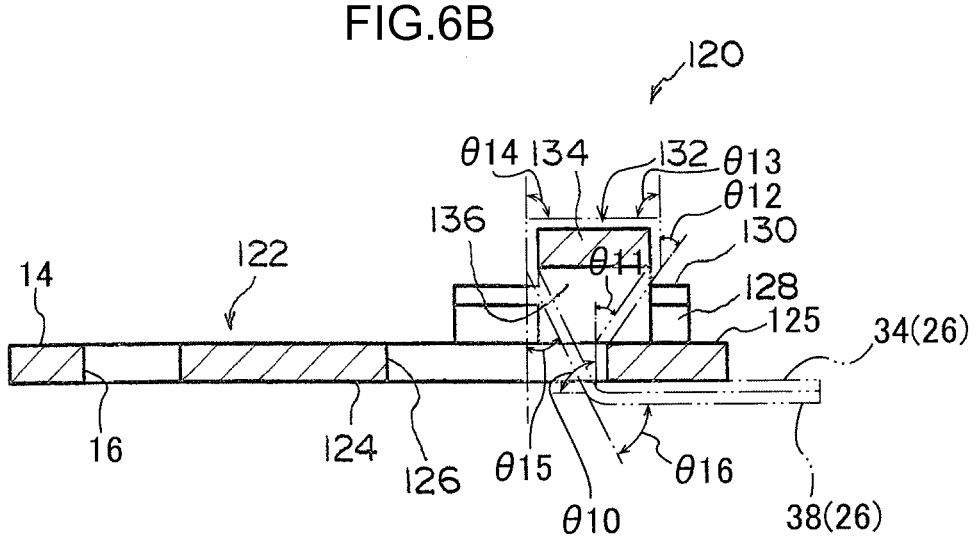

Further, as shown in FIGS. 6A and 6B, at the present tongue 120, the webbing 26 is folded over by being passed-through the through-hole 126 from the side of the base portion 124 opposite the slider 132 and being trained around the slider main body 134, and the webbing 26 is again passed-through the through-hole 126. Namely, in the present embodiment, the portion of the webbing 26 further toward the proximal end side than the slider main body 134 is the shoulder webbing 34, and the portion of the webbing 26 further toward the distal end side than the slider main body 134 is the lap webbing 38.

On the other hand, as shown in FIGS. 5A and 5B, shear pins 140 are formed at one surface in the thickness direction of the base portion 124. The shear pins 140 are formed on the base portion 124 at the side of the slider 132 that is opposite the side at which the insertion portion 14 is provided, and face the pushing pieces 138 along the sliding direction of the slider 132.

Operation and Effects of Second Embodiment

Operation and effects of the present embodiment are described next.

In the state in which the vehicle occupant 24 who is seated in the seat 28 places the webbing 26 around his/her body and attaches the insertion portion of the tongue 120 to the buckle 18, the slider main body 134 of the slider 132 is pulled by the webbing 26 toward the proximal end side of the tongue 120, but, as shown in FIG. 5A and FIG. 6A, the pushing pieces 138 are held at positions abutting the shear pins 140.

In this state, the webbing 26 contacts one surface in the thickness direction of the slider main body 134 (the surface at the side opposite the base portion 124), and the portion of the webbing 26, which portion contacts the one surface in the thickness direction of the slider main body 134, is bent at an angle of $\theta 7$ (hereinafter called bending angle $\theta 7$) with respect to the portion of the webbing 26 that is further toward the proximal end side than this portion. Further, the portion of the webbing 26, which portion is further toward the distal end side than the portion that contacts the one surface in the thickness direction of the slider main body 134, contacts one width direction end of the slider main body 134 (the end portion at the insertion portion 14 side).

The portion of the webbing 26, which portion contacts the one width direction end of the slider main body 134, is bent at an angle of $\theta 8$ (hereinafter called bending angle $\theta 8$) with respect to the portion that contacts the one surface in the thickness direction of the slider main body 134. Further, the portion of the webbing 26, which portion is further toward the distal end side than the portion that contacts the one width direction end of the slider main body 134, is bent at an angle of $\theta 9$ (hereinafter called bending angle $\theta 9$) with respect to the portion that contacts the one width direction end of the slider main body 134.

When, in this state, the vehicle rapidly decelerates and the body of the vehicle occupant 24 pushes the lap webbing 38 of the webbing 26 toward the vehicle front side, the tension of the webbing 26 that increases due thereto pulls the slider main body 134 of the slider 132. When the slider main body 134 is pulled in this way, the pushing pieces 138 push the shear pins 140 and break the shear pins 140. Due thereto, the interference of the shear pins 140 with respect to the slider 132 is cancelled, and, as shown in FIG. 5B and FIG. 6B, the slider 132 slides toward the proximal end side of the tongue 120 (i.e., the side opposite the insertion portion 14).

Due to the slider 132 sliding in this way, the other width direction end of the slider main body 134 (the end portion at the side opposite the insertion portion 14) is positioned further toward the proximal end side of the tongue 120 (i.e., the side opposite the insertion portion 14) than the end portion of the through-hole 126 at the side opposite the insertion portion 14. Due thereto, as shown in FIG. 6B, the webbing 26 slidingly-contacts not only the slider main body 134, but also the portion of the inner peripheral portion of the through hole 126 at the side opposite the insertion portion 14. Further, the portion of the webbing 26, which portion is further toward the proximal end side than the portion that slidingly-contacts the inner peripheral portion of the through-hole 126, slidingly-contacts the surface of the train-around portion 125 at the side opposite the slider 132.

In this state, the portion of the webbing 26, which portion contacts the inner peripheral portion of the through-hole 126, is bent at an angle of $\theta 10$ (hereinafter called bending angle $\theta 10$) with respect to the portion that contacts the train-around portion 125. Further, the portion of the webbing 26, which portion is between the train-around portion 125 and the other width direction end of the slider main body 134 (the end portion at the side opposite the insertion portion 14), is bent at an angle of $\theta 11$ (hereinafter called bending angle $\theta 11$) with respect to the portion of the webbing 26 that contacts the inner peripheral portion of the through-hole 126. Moreover, the portion of the webbing 26, which portion contacts the other width direction end of the slider main body 134, is bent at an angle of $\theta 12$ (hereinafter called bending angle $\theta 12$) with respect to the portion of the webbing 26 which portion is between the train-around portion 125 and the other width direction end of the slider main body 134.

Moreover, the portion of the webbing 26, which portion contacts the one surface in the thickness direction of the slider main body 134, is bent at an angle of $\theta 13$ (hereinafter called bending angle $\theta 13$) with respect to the portion that contacts the other width direction end of the slider main body 134. The portion of the webbing 26, which portion contacts the one width direction end of the slider main body 134 (the end portion at the insertion portion 14 side), is bent at an angle of $\theta 14$ (hereinafter called bending angle $\theta 14$) with respect to the portion that contacts the one surface in the thickness direction of the slider main body 134. The portion of the webbing 26, which portion is between the one width direction end of the slider main body 134 and the train-around portion 125, is bent at an angle of $\theta 15$ (hereinafter called bending angle $\theta 15$) with respect to the portion that contacts the one width direction end of the slider main body 134. The portion of the webbing 26, which portion is further toward the distal end side than the portion between the one width direction end of the slider main body 134 and the train-around portion 125, is bent at an angle of $\theta 16$ (hereinafter called bending angle $\theta 16$) with respect to that portion that is between the one width direction end of the slider main body 134 and the train-around portion 125.

In other words, a portion of the webbing which is further toward the proximal end side than the folded over portion (the slider 132) (a portion of the shoulder webbing 34) and a portion of the webbing which is further toward the distal end side than the folded over portion (a portion of the lap webbing 38) contact with each other in the vicinity of the folded over portion (FIG. 6B).

The total sum (bending angle $\theta 10$+bending angle $\theta 11$+bending angle $\theta 12$+bending angle $\theta 13$+bending angle $\theta 14$+bending angle $\theta 15$+bending angle $\theta 16$) of the bending angles from the bending angle $\theta 10$ to the bending angle $\theta 16$ is greater than the total sum (bending angle θ7+bending angle θ8+bending angle θ9) of the bending angles from the bending angle θ7 to the bending angle θ9 which are angles before the slider 132 slides. Due thereto, the frictional resistance between the webbing 26 and the tongue 120 increases.

Due to the frictional resistance between the webbing 26 and the tongue 120 increasing in this way, movement of the webbing 26 along the longitudinal direction thereof is suppressed. Due thereto, the portion of the webbing 26 at the shoulder webbing 34 side passing-through the through-hole 126 and moving toward the lap webbing 38 side, i.e., the length of the lap webbing 38 increasing, can be prevented or suppressed, and the waist portion of the vehicle occupant 24 can be effectively restrained by the lap webbing 38, and inertial movement of the vehicle occupant 24 toward the vehicle front side can be effectively suppressed.

Further, at the tongue 120, the shape and the like of the leg plates 136 are set such that the interval between the surface of the base portion 124, including the train-around portion 125, at the slider 132 side, and the surface of the slider main body 134 at the base portion 124 side, is greater than the thickness of the webbing 26. Therefore, the base portion 124 (including the train-around portion 125) and the slider main body 134 do not clamp the webbing 26. Thus, as described above, even in a state in which increasing of the length of the lap webbing 38 is prevented or suppressed, a large load is not applied locally to the webbing 26.

Structure of Third Embodiment

A third embodiment is described next.

The overall structure of a tongue 160 for a seat belt device (hereinafter called tongue 160), that is the structure of the main portion of a seat belt device 161 relating to the present embodiment, is shown in plan views in FIGS. 7A and 7B. The structure of the tongue 160 is shown in sectional views in FIGS. 8A and 8B.

As shown in these drawings, the tongue 160 has top wall portions 162 instead of the top wall portions 130. Portions of the top wall portions 162, which portions are at the proximal end side of the tongue main body 122, are stoppers 164, and extend further toward the width direction inner side of the tongue main body 122 than the portions of the top wall portions 162, which portions are further toward the distal end side of the tongue main body 122 than the stoppers 164.

On the other hand, the present tongue 160 has, instead of the slider 132, a slider 166 that is a fold-over portion and is a train-around portion, and further, that serves as a movable portion that structures a bending angle increasing section. Differently than the slider 132, the slider 166 is formed in the shape of a thin-width plate that does not have the leg plates 136. The shear pins 140 stand from the base portion 124 at the portion further toward the proximal end side of the tongue 160 than the slider 166 (FIG. 7A). Due to the shear pins 140 interfering with the slider 166, the slider 166 sliding toward the proximal end side of the tongue 160 is restricted.

Abutment projections 168 are formed from the longitudinal direction both end portions of the slider 166 so as to project toward the proximal end side of the tongue main body 122. These abutment projections 168 face the stoppers 164 that serve as restricting portion and that are provided further toward the proximal end side of the tongue 160 than the shear pins 140. Due to the abutment projections 168, that are a portion of the slider 166 (i.e., a portion of the movable portion) abutting the stoppers 164, further sliding of the slider 166 toward the proximal end side of the tongue main body 122 is restricted. The projecting dimensions of the abutment projections 168, the shapes and positions of the stoppers 164, and the like are set such that, in the state in which the abutment projections 168 abut the stoppers 164, the interval, along the direction from the proximal end side toward the distal end side of the tongue main body 122, between the end portion at the slider 166, which end portion is at the proximal end side of the tongue main body 122, and the end portion at the through-hole 126, which end portion is at the proximal end side of the tongue main body 122, is sufficiently larger than the thickness of the webbing 26.

Operation and Effects of Third Embodiment

Operation and effects of the present embodiment are described next.

Figure 8A:
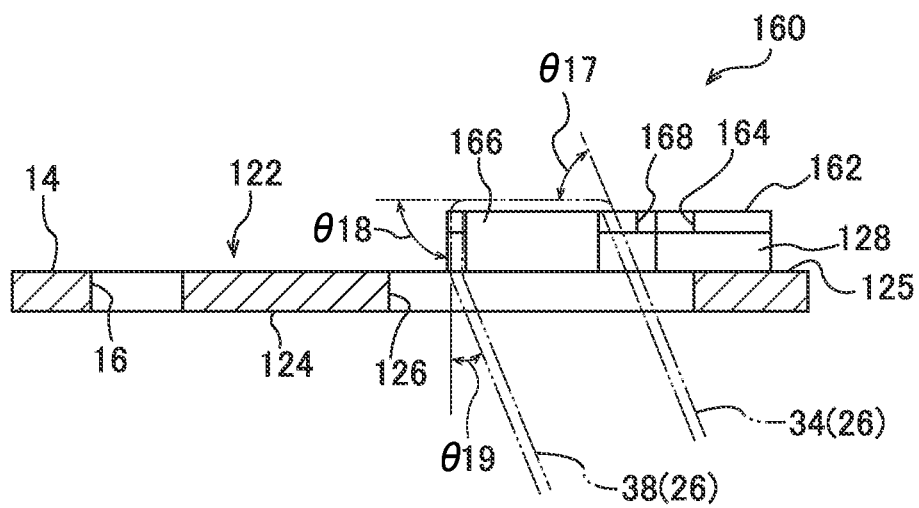
FIGS. 8A and 8B are sectional views of the tongue for a seat belt device relating to the third embodiment.

In the state in which the vehicle occupant 24 who is seated in the seat 28 places the webbing 26 around his/her body and attaches the insertion portion 14 of the tongue 160 to the buckle 18, the slider 166 is pulled by the webbing 26 toward the proximal end side of the tongue 160, but, as shown in FIG. 7A and FIG. 8A, the pushing pieces 138 are held at positions abutting the shear pins 140.

In this state, the webbing 26 contacts one surface in the thickness direction of the slider 166 (the surface at the side opposite the base portion 124), and the portion of the webbing 26, which portion contacts the one surface in the thickness direction of the slider 166, is bent at an angle of θ17 (hereinafter called bending angle θ17) with respect to the portion of the webbing 26 that is further toward the proximal end side than this portion. Further, the portion of the webbing 26, which portion is further toward the distal end side than the portion that contacts the one surface in the thickness direction of the slider 166, contacts one width direction end of the slider 166 (the end portion at the insertion portion 14 side).

The portion of the webbing 26, which portion contacts the one width direction end of the slider 166, is bent at an angle of θ18 (hereinafter called bending angle θ18) with respect to the portion that contacts the one surface in the thickness direction of the slider 166. Further, the portion of the webbing 26, which portion is further toward the distal end side than the portion that contacts the one width direction end of the slider 166, is bent at an angle of θ19 (hereinafter called bending angle θ19) with respect to the portion that contacts the one width direction end of the slider 166.

Figure 8B:
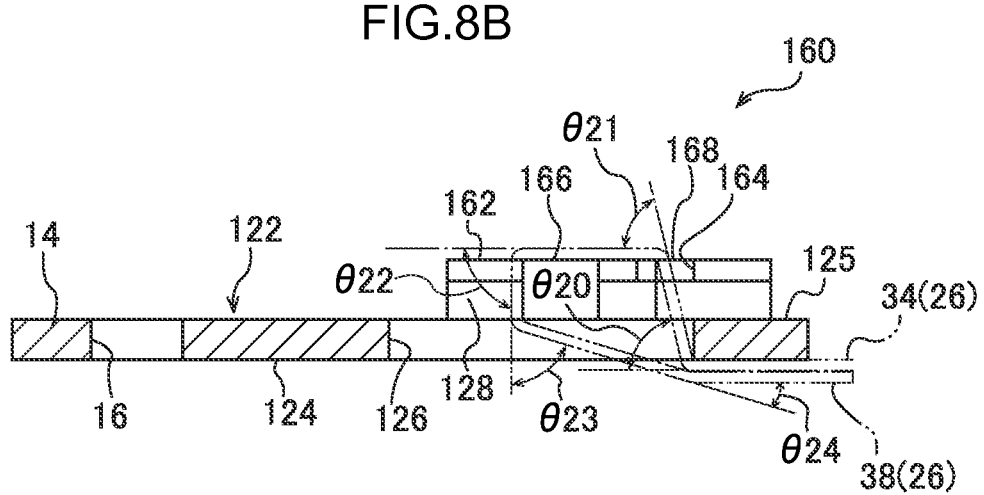

When, in this state, the vehicle rapidly decelerates and the body of the vehicle occupant 24 pushes the lap webbing 38 of the webbing 26 toward the vehicle front side, the tension of the webbing 26 that increases due thereto pulls the slider 166. When the slider 166 is pulled in this way, the slider 166 pushes the shear pins 140 and breaks the shear pins 140. Due thereto, the interference of the shear pins 140 with respect to the slider 166 is cancelled, and, as shown in FIG. 7B and FIG. 8B, the slider 166 slides toward the proximal end side of the tongue 160 (i.e., the side opposite the insertion portion 14) until the abutment projections 168 abut the stoppers 164.

Due to the slider 166 sliding in this way, the other width direction end of the slider 166 (the end portion at the side opposite the insertion portion 14) is positioned further toward the proximal end side of the tongue 160 (i.e., the side opposite the insertion portion 14) than the end portion of the through-hole 126 at the side opposite the insertion portion 14. Due thereto, as shown in FIG. 8B, the webbing 26 slidingly-contacts not only the slider 166, but also the portion at the inner peripheral portion of the through hole 126 at the side opposite the insertion portion 14. Further, the portion of the webbing 26, which portion is further toward the proximal end side than the portion that slidingly-contacts the inner peripheral portion of the through-hole 126, slidingly-contacts the surface of the train-around portion 125 at the side opposite the slider 166.

In this state, the portion of the webbing 26, which portion is between the train-around portion 125 and the other width direction end of the slider 166 (the end portion at the side opposite the insertion portion 14), is bent at an angle of θ20 (hereinafter called bending angle θ20) with respect to the portion of the webbing 26 that contacts the surface of the train-around portion 125 at the side opposite the slider 166. Further, the portion of the webbing 26, which portion contacts one surface in the thickness direction of the slider 166 (the surface at the side opposite the base portion 124), is bent at an angle of θ21 (hereinafter called bending angle θ21) with respect to the portion of the webbing 26 between the train-around portion 125 and the other width direction end of the slider 166.

Moreover, the longitudinal direction of the portion of the webbing 26, which portion contacts one width direction end of the slider 166 (the end portion at the insertion portion 14 side), is bent at an angle of θ22 (hereinafter called bending angle θ22) with respect to the portion that contacts the one surface in the thickness direction of the slider 166. The portion of the webbing 26, which portion is between the one width direction end of the slider 166 and the train-around portion 125, is bent at an of θ23 (hereinafter called bending angle θ23) with respect to the portion of the webbing 26 that contacts the one width direction end of the slider 166. The portion of the webbing 26, which portion is further toward the distal end side than the portion between the one width direction end of the slider 166 and the train-around portion 125, is bent at an angle of θ24 (hereinafter called bending angle θ24) with respect to the portion between the one width direction end of the slider 166 and the train-around portion 125.

The total sum (bending angle θ20+bending angle θ21+bending angle θ22+bending angle θ23+bending angle θ24) of the bending angles from the bending angle θ20 to the bending angle θ24 is greater than the total sum (bending angle θ17+bending angle θ18+bending angle θ19) of the bending angles from the bending angle θ17 to the bending angle θ19 before the slider 166 slides. Due thereto, the frictional resistance between the webbing 26 and the tongue 160 increases.

Due to the frictional resistance between the webbing 26 and the tongue 160 increasing in this way, movement of the webbing 26 along the longitudinal direction thereof is suppressed. Due thereto, the portion of the webbing 26 at the shoulder webbing 34 side passing-through the through-hole 126 and moving toward the lap webbing 38 side, i.e., the length of the lap webbing 38 increasing, can be prevented or suppressed, and the waist portion of the vehicle occupant 24 can be effectively restrained by the lap webbing 38, and inertial movement of the vehicle occupant 24 toward the vehicle front side can be effectively suppressed.

Further, at the present tongue 160, even though the abutment projections 168 abut the stoppers 164, the interval between the end portion of the slider 166 at the proximal end side of the tongue main body 122, and the end portion of the through-hole 126 at the proximal end side of the tongue main body 122, is sufficiently larger than the thickness of the webbing 26, and further, this state is maintained. Therefore, the base portion 124 (including the train-around portion 125) and the slider 166 do not clamp the webbing 26. Thus, as described above, even in a state in which increasing of the length of the lap webbing 38 is prevented or suppressed, a large load is not applied locally to the webbing 26.

Structure of Fourth Embodiment

A fourth embodiment is described next.

Figure 9:
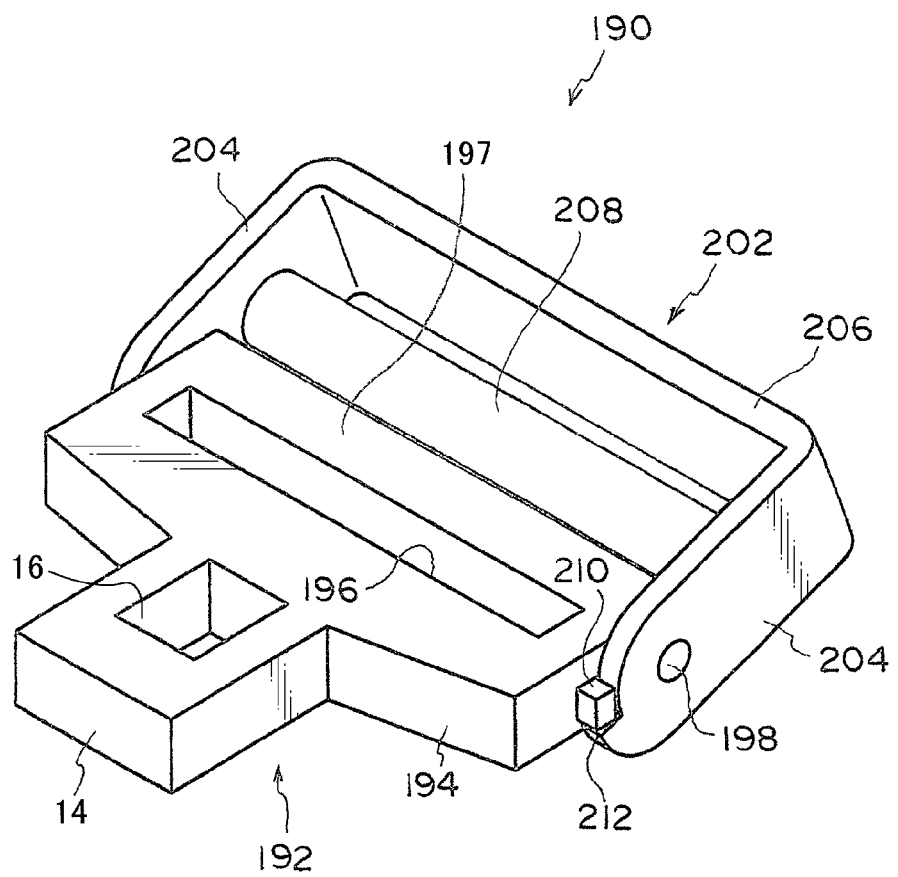
FIG. 9 is a perspective view of overall structure of a tongue for a seat belt device relating to a fourth embodiment.

The overall structure (appearance) of a tongue 190 for a seat belt device (hereinafter called tongue 190), that is the structure of the main portion of a seat belt device 191 relating to the present embodiment, is shown in a perspective view in FIG. 9. The structure of the tongue 190 is shown in sectional views in FIGS. 10A and 10B.

As shown in these drawings, the tongue 190 has a tongue main body 192 that is formed by punching-out a metal flat plate. The tongue main body 192 has the insertion portion 14. A base portion 194 is formed continuously from the proximal end portion of the insertion portion 14. The base portion 194 is shaped as a rectangular (trapezoidal) flat plate whose width dimension is sufficiently longer than the width dimension of the insertion portion 14. A through-hole 196 through which the webbing 26 passes is formed in the base portion 194. The portion of the base portion 194, which portion is at the side of the through-hole 196 opposite the side at which the insertion portion 14 is provided, is a fold-over/train-around portion 197 that serves as what are called the train-around portion (the fold-over portion) in the aspects of the invention. Further, shafts 198 are formed from the width direction both end portions of the base portion 194 so as to project-out, coaxially to one another, toward the width direction outer sides of the base portion 194.

On the other hand, the present tongue 190 has a rotating member 202 that serves as a movable portion that structures a bending angle increasing section. The rotating member 202 has a pair of arms 204 that face one another in the width direction of the tongue main body 192. Through-holes, into which the shafts 198 are inserted, are formed in longitudinal direction one ends of these arms 204. The arms 204 are supported, so as to be rotatable around the shafts 198, due to the shafts 198 being inserted in the through-holes. In contrast, the longitudinal direction other end portions of the arms 204 are connected integrally by a connecting portion 206, and the rotating member 202 forms a concave shape that opens toward the distal end side of the tongue main body 192 in plan view.

A shaft 208 that serves as a train-around portion is provided at the longitudinal direction intermediate portions of the arms 204 at a position that is apart, by greater than or equal to the thickness of the webbing 26, from the connecting portion 206. The shaft 208 is formed in, for example, the shape of a round bar having a circular cross-section. One longitudinal direction end portion of the shaft 208 is supported at one of the arms 204, and the other longitudinal direction end portion is supported at the other arm 204. Note that, in the present embodiment, the shaft 208 is formed in the shape of a round bar having a circular cross-section, but the shape of the shaft 208 is not limited to a round bar shape, and may be a bar shape having an oval cross-section, or may be an angular bar shape having a polygonal cross-section.

Figure 10A:
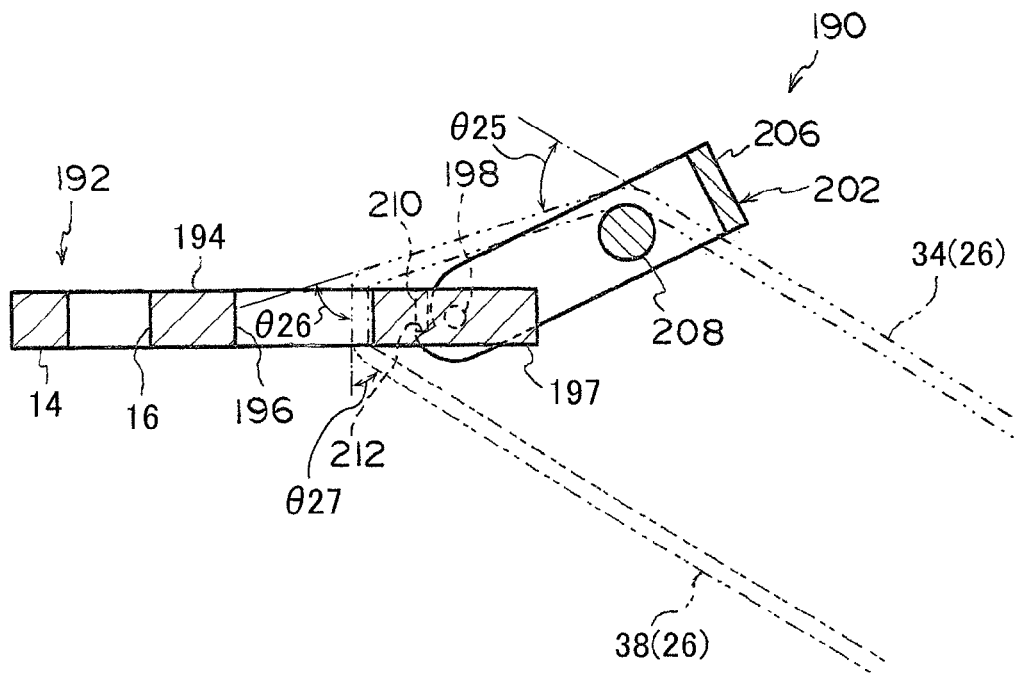
FIGS. 10A and 10B are sectional views of the tongue for a seat belt device relating to the fourth embodiment.
Figure 10B:
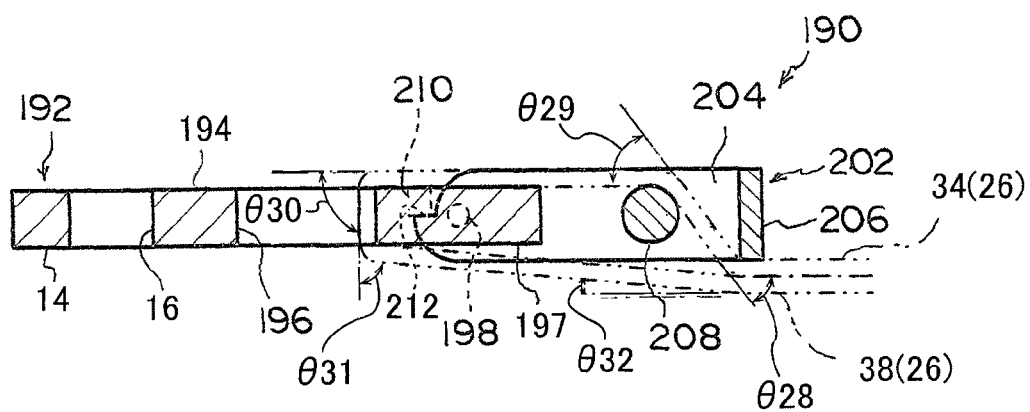

Further, as shown in FIG. 10A and FIG. 10B, at the present tongue 190, the portion of the webbing 26, which portion is further toward the distal end side than the shoulder webbing 34, passes-through the through-hole 196 from the other side in the thickness direction of the base portion 194, and passes-through between the connecting portion 206 and the shaft 208 from the one side in the thickness direction of the tongue main body 192. The portion of the webbing 26, which portion is further toward the distal end side than the portion that passes-through between the connecting portion 206 and the shaft 208, is the lap webbing 38, and the portion of the webbing 26, which portion is further toward the proximal end side than the pass-through hole 196, is the shoulder webbing 34.

On the other hand, shear pins 210 are formed to project-out at the width direction side end portions of the tongue main body 192, further toward the distal end side of the tongue main body 122 than the shaft 198. Pushing portion 212 are formed at the distal end portions of the arms 204 in correspondence with these shear pins 210. The pushing portions 212 face the shear pins 210 around the shafts 198. When the rotational force of the rotating member 202, that is based on the tension of the webbing 26, becomes greater than or equal to a given magnitude, the pushing portions 212 push and break the shear pins 210.

Operation and Effects of Fourth Embodiment

Operation and effects of the present embodiment are described next.

In the state in which the vehicle occupant 24 who is seated in the seat 28 places the webbing 26 around his/her body and attaches the insertion portion 14 of the tongue 190 to the buckle 18, due to the tension of the lap webbing 38 at the webbing 26, the lap webbing 38 pushes the shaft 208 and rotates the rotating member 202 until the shear pins 210 interfere with the pushing portions 212. In this state, as shown in FIG. 10A, the webbing 26 slidingly-contacts only a portion of the inner peripheral portion of the through-hole 196, portions of the outer peripheries of the shaft 208 and the base portion 194.

In this state, the portion of the webbing 26, which portion is further toward the distal end side than shaft 208, is bent at an angle of θ25 (hereinafter called bending angle θ25) with respect to the longitudinal direction proximal end side. Further, the portion of the webbing 26, which portion contacts the inner peripheral portion of the through-hole 196, is bent at an angle of θ26 (hereinafter called bending angle θ26) with respect to the portion between the shaft 208 and the inner peripheral portion of the through-hole 196. Moreover, the portion of the webbing 26, which portion is further toward the distal end side than the portion that contacts the inner peripheral portion of the through-hole 196, is inclined at an angle of θ27 (hereinafter called bending angle θ27) with respect to the portion that contacts the inner peripheral portion of the through-hole 196.

When, in this state, the vehicle rapidly decelerates and the body of the vehicle occupant 24 pushes the lap webbing 38 of the webbing 26 toward the vehicle front, the tension of the webbing 26 that increases due thereto pushes the shaft 208, and, due to the rotational force around the shafts 198 that arises due thereto, the arms 204 break the shear pins 210. When the restriction on the rotation of the rotating member 202 is cancelled due to the shear pins 210 being broken, the rotating member 202 rotates until the longitudinal direction of the arms 204 are along the direction from the proximal end side to the distal end side of the tongue main body 192. Due thereto, as shown in FIG. 10B, the webbing 26 slidingly-contacts the other surface in the thickness direction of the base portion 194.

In this state, the webbing 26 slidingly-contacts the connecting portion 206 of the rotating member 202, and the portion of the webbing 26, which portion is further toward the distal end side than the connecting portion 206, is bent at an angle of θ28 (hereinafter called bending angle θ28) with respect to the longitudinal direction proximal end side. Further, the portion of the webbing 26 further toward the distal end side than the shaft 208 is bent at an angle of θ29 (hereinafter called bending angle θ29) with respect to the portion of the webbing 26 between the connecting portion 206 and the shaft 208.

Moreover, the portion of the webbing 26, which portion slidingly-contacts the inner peripheral portion of the through-hole 196, is bent at an angle of θ30 (hereinafter called bending angle θ30) with respect to the portion of the webbing 26 that is between the shaft 208 and the inner peripheral portion of the through-hole 196. The portion of the webbing 26 up until the lap webbing 38 overlaps the shoulder webbing 34 is bent at an angle of θ31 (hereinafter called bending angle θ31) with respect to the portion of the webbing 26 that slidingly-contacts the inner peripheral portion of the through-hole 196. Further, the portion, that is further toward the distal end side than the portion up until the lap webbing 38 overlaps the shoulder webbing 34, is bent at an angle of θ32 (hereinafter called bending angle θ32) with respect to the portion up until the lap webbing 38 overlaps the shoulder webbing 34.

Due to the frictional resistance between the webbing 26 and the tongue 190 increasing in this way, movement of the webbing 26 along the longitudinal direction thereof is suppressed. Due thereto, the portion of the webbing 26 at the shoulder webbing 34 side passing-through the through-hole 196 and moving toward the lap webbing 38 side can be suppressed, and the waist portion of the vehicle occupant 24 can be effectively restrained by the lap webbing 38, and inertial movement of the vehicle occupant 24 toward the vehicle front side can be effectively suppressed.

Moreover, the interval between the connecting portion 206 and the shaft 208 is larger than the thickness dimension of the webbing 26, and, even if the rotating member 202 rotates, the interval between the connecting portion 206 and the shaft 208 does not change. Therefore, the webbing 26 is not clamped by the connecting portion 206 and the shaft 208, and accordingly, a large load is not applied locally to the webbing 26.

Structure of Fifth Embodiment

A fifth embodiment is described next.

The overall structure of a tongue 240 for a seat belt device (hereinafter called tongue 240), that is the structure of the main portion of a seat belt device 241 relating to the present embodiment, is shown in a perspective view in FIG. 11. The structure of the tongue 240 is shown in sectional views in FIGS. 12A and 12B.

As shown in these drawings, the tongue 240 has a tongue main body 242 that is formed by punching-out and bending-molding a metal flat plate. The insertion portion 14 that is rectangular in plan view is formed at the tongue main body 242. One of a pair of leg plates 244 is formed continuously from one width direction end side of the insertion portion 14 at one longitudinal direction end of the insertion portion 14. Another of the pair of leg plates 244 is formed continuously from the other width direction end side of the insertion portion 14 at the one longitudinal direction end of the insertion portion 14. The interval between the one leg plate 244 and the other leg plate 244 is made to be greater than or equal to the width dimension of the webbing 26, and the webbing 26 can pass between the both leg plates 244. Further, at the longitudinal direction intermediate portions thereof, these leg plates 244 are bent in the shapes of cranks around an axis whose axial direction is the width direction. Engaging pieces 246 extend toward the width direction outer sides of the insertion portion 14 from longitudinal direction one ends of the leg plates 244.

On the other hand, the tongue 240 has a plate 248 that serves as a bending angle increasing section. The plate 248 has a base portion 250 that serves as a sliding-contact portion and is formed in the shape of a flat plate. The base portion 250 is formed in the shape of a flat plate that is a substantial rectangle whose longitudinal direction runs along the width direction of the insertion portion 14. A through-hole 252 is formed in the base portion 250. The through-hole 252 passes-through in the thickness direction of the base portion 250. The opening shape of the through-hole 252 is a rectangle whose longitudinal direction runs along the longitudinal direction of the base portion 250. The longitudinal direction dimension of the through-hole 252 is set to be larger than the width dimension of the webbing 26. In the state in which the tongue main body 242 and the base portion 250 are assembled, the side of the base portion 250, which side is further toward the insertion portion 14 side than the through-hole 252, is a first train-around portion 254 that serves as a fold-over portion and a train-around portion, and the side of the base portion 250, that is at the side of the through-hole 252 opposite the side at which the insertion portion 14 is provided, is a second train-around portion 256 that serves as a movable portion and a train-around portion.

Figure 12A:
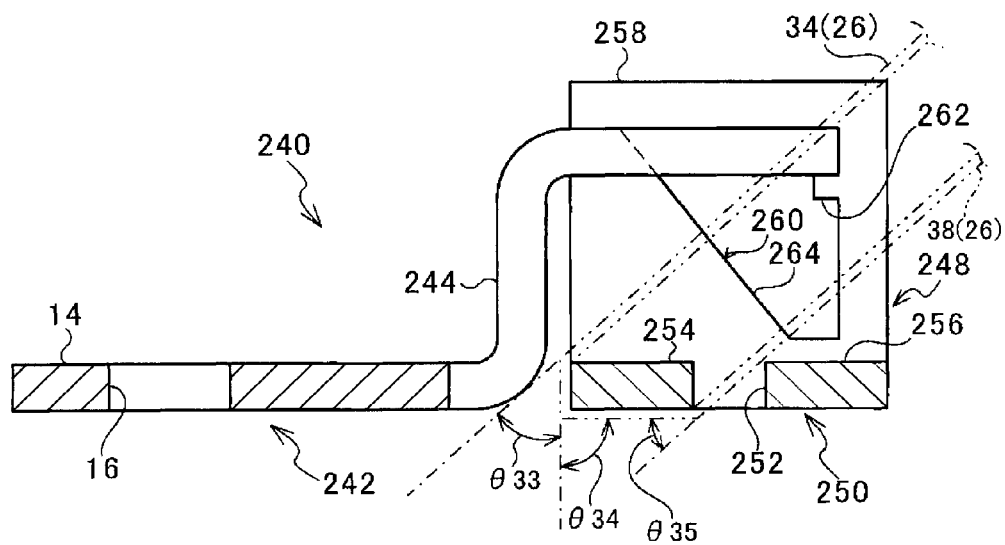
FIGS. 12A and 12B are sectional views of the tongue for a seat belt device relating to fifth embodiment.
Figure 12B:
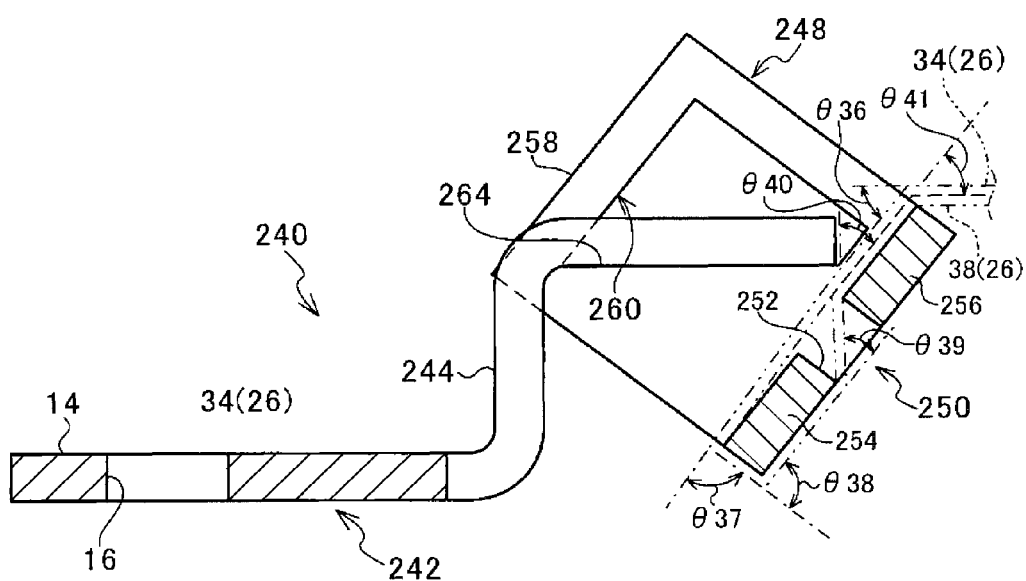

As shown in FIGS. 12A and 12B, in the present exemplary embodiment, the webbing 26 is trained around the side of the first train-around portion 254, which side is opposite the second train-around portion 256, so as to circle-in from one side in the thickness direction of the base portion 250, and the webbing 26 passes-through the through-hole 252 between the first train-around portion 254 and the second train-around portion 256, and extends toward the one side in the thickness direction of the base portion 250. Namely, in the present embodiment, the portion of the webbing 26, which portion is further toward the proximal end side than the portion trained-around the first train-around portion 254, is the shoulder webbing 34, and the distal end side is the lap webbing 38.

Figure 11:
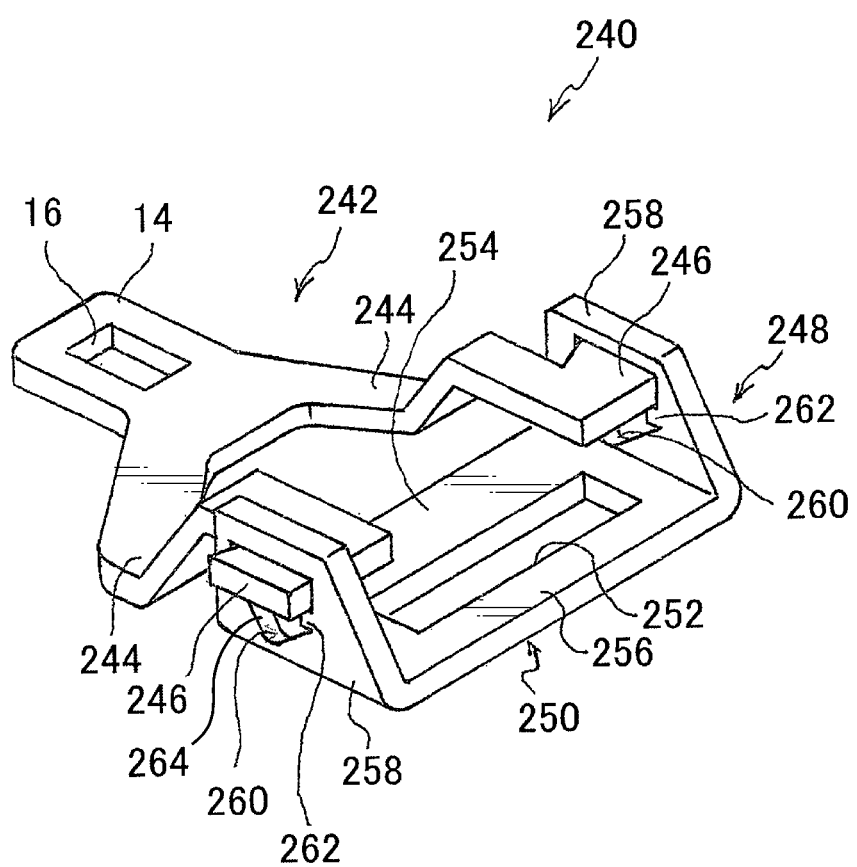
FIG. 11 is a perspective view of a tongue for a seat belt device relating to a fifth embodiment.

On the other hand, as shown in FIG. 11, vertical wall portions 258 stand from longitudinal direction both end portions of the base portion 250 toward the one side in the thickness direction of the base portion 250. Guide holes 260 are formed in these vertical wall portions 258 so as to pass-through in the thickness directions of the vertical wall portions 258. The opening shapes of the guide holes 260 are triangular or fan-shaped, and the engaging pieces 246 pass-through the guide holes 260 from the longitudinal direction inner side of the base portion 250.

The shapes of the guide holes 260 are set such that, in the state in which the engaging pieces 246 are passed-through the guide holes 260, the plate 248 can rotate, with respect to the tongue main body 242, around an axis whose axial direction is the longitudinal direction of the base portion 250. However, shear projections 262 are formed at the inner peripheral portions of the guide holes 260, and, due to the shear projections 262 interfering with the engaging pieces 246, rotation of the plate 248 with respect to the tongue main body 242 is restricted, and the engaging pieces 246 are held at positions of being set apart from the base portion 250.

When the engaging pieces 246 of the tongue main body 242 break the shear projections 262 due to the tension of the webbing 26, the plate 248 rotates until restricting portions 264, that serve as restricting portions and are portions of the inner peripheral portions of the guide holes 260, abut the engaging pieces 246.

Operation and Effects of Fifth Embodiment

Operation and effects of the present embodiment are described next.

In the state in which the vehicle occupant 24 who is seated in the seat 28 places the webbing 26 around his/her body and attaches the insertion portion of the tongue 240 to the buckle 18, the engaging pieces 246 of the tongue main body 242 interfere with the shear projections 262 as shown in FIG. 12A, and the engaging pieces 246 are held at positions of being set apart from the base portion 250.

In this state, the webbing 26 is trained-around the first train-around portion 254, and the portion of the webbing 26, which portion is further toward the distal end side than the portion trained-around the first train-around portion 254, passes-through the through-hole 252. In this state, the portion of the webbing 26, which portion contacts the first train-around portion 254 at the side opposite the second train-around portion 256, is bent at an angle of θ33 (hereinafter called bending angle θ33) with respect to the portion of the webbing 26, which portion is further toward the proximal end side than the portion that contacts the first train-around portion 254 at the side opposite the second train-around portion 256.

Further, further toward the distal end side than the portion that contacts the first train-around portion 254 at the side opposite the second train-around portion 256, the webbing 26 contacts the other surface in the thickness direction of the first train-around portion 254. The portion of the webbing 26, which portion contacts the other surface in the thickness direction of the first train-around portion 254, is bent at an angle of θ34 (hereinafter called bending angle θ34) with respect to the portion that contacts the first train-around portion 254 at the side opposite the second train-around portion 256. Further, the portion of the webbing 26, which portion is further toward the distal end side than the portion that contacts the other surface in the thickness direction of the first train-around portion 254, is bent at an angle of θ35 (hereinafter called bending angle θ35) with respect to the portion that contacts the other surface in the thickness direction of the first train-around portion 254.

When, in this state, the vehicle rapidly decelerates and the body of the vehicle occupant 24 pushes the lap webbing 38 of the webbing 26 toward the vehicle front, the tension of the webbing 26 that increases due thereto pulls the plate 248. Due to the plate 248 being pulled in this way, the shearing projections 262 push the engaging pieces 246 and, due thereto, the shearing projections 262 deform or break due to the pushing reaction force that the engaging pieces 246 apply to the shearing projections 262. The interference of the shearing projections 262 with respect to the engaging pieces 246 is cancelled, and rotation of the plate 248 with respect to the tongue main body 242 is permitted.

In this state, the plate 248 is pulled by the tension of the webbing 26, and the plate 248 rotates around an axis, whose axial direction is the width direction of the base portion 250, with respect to the tongue main body 242 until the restricting portions 264 of the guide holes 260 abut the engaging pieces 246. When the plate 248 rotates in this way, as shown in FIG. 12B, the lap webbing 38 is pushed by one surface in the thickness direction of the second train-around portion 256, and the path of passage of the lap webbing 38, at the one side in the thickness direction of the second train-around portion 256, is changed.

Further, the second train-around portion 256 pushes the shoulder webbing 34 via the lap webbing 38 that is pushed, and, due thereto, the path of passage of the shoulder webbing 34, at the one side in the thickness direction of the second train-around portion 256, is changed. The webbing 26, whose path of passage is changed in this way, is trained-around, of the outer peripheral portion of the first train-around portion 254, the portions other than the surface that structures the inner peripheral portion of the through-hole 252, and is trained-around the second train-around portion 256 in a state in which the shoulder webbing 34 and the lap webbing 38 overlap.

In this state, the portion of the webbing 26, which portion faces the one surface in the thickness direction of the second train-around portion 256 and the one surface in the thickness direction of the first train-around portion 254, is bent at an angle of θ36 (hereinafter called bending angle θ36) with respect to the portion of the webbing 26 that is further toward the proximal end side than the second train-around portion 256. Further, the portion of the webbing 26, which portion slidingly-contacts the end surface of the first train-around portion 254 at the side opposite the through-hole 252, is bent at an angle of θ37 (hereinafter called bending angle θ37) with respect to the portion of the webbing 26 which portion faces the one surface in the thickness direction of the second train-around portion 256 and the one surface in the thickness direction of the first train-around portion 254. Moreover, the portion of the webbing 26, which portion slidingly-contacts the surface at the other side in the thickness direction of the first train-around portion 254, is bent at an angle of θ38 (hereinafter called bending angle θ38) with respect to the portion of the webbing 26 which portion slidingly-contacts the end surface of the first train-around portion 254 at the side opposite the through-hole 252.

The portion of the webbing 26 that is passed-through the through-hole 252 is bent at an angle of θ39 (hereinafter called bending angle θ39) with respect to the portion of the webbing 26 which portion slidingly-contacts the surface at the other side in the thickness direction of the first train-around portion 254. Further, the portion of the webbing 26, which portion slidingly-contacts the one surface in the thickness direction of the second train-around portion 256, is bent at an angle of θ40 (hereinafter called bending angle θ40) with respect to the portion of the webbing 26 that is passed-through the through-hole 252. Moreover, the portion of the webbing 26, which is further toward the longitudinal direction distal end side than the portion thereof that slidingly-contacts the one surface in the thickness direction of the second train-around portion 256, is bent at an angle of θ41 (hereinafter called bending angle θ41) with respect to this portion of the webbing 26 that slidingly-contacts the one surface in the thickness direction of the second train-around portion 256.

The total sum (bending angle θ36+bending angle θ37+bending angle θ38+bending angle θ39+bending angle θ40+bending angle θ41) of the bending angles from the bending angle θ36 to the bending angle θ41 is greater than the total sum (bending angle θ33+bending angle θ34+bending angle θ35) of the bending angles from the bending angle θ33 to the bending angle θ35 before the plate 248 rotates. Due thereto, the frictional resistance between the webbing 26 and the tongue 240 increases.

Due to the frictional resistance between the webbing 26 and the tongue 240 increasing in this way, movement of the webbing 26 along the longitudinal direction thereof is suppressed. Due thereto, the portion of the webbing 26 at the shoulder webbing 34 side passing-through the through-hole 242 and moving toward the lap webbing 38 side, i.e., the length of the lap webbing 38 increasing, can be prevented or suppressed, and the waist portion of the vehicle occupant 24 can be effectively restrained by the lap webbing 38, and inertial movement of the vehicle occupant 24 toward the vehicle front side can be effectively suppressed.

Moreover, because the interval between the first train-around portion 254 and the second train-around portion 256 is greater than the thickness dimension of the webbing 26, the first train-around portion 254 and the second train-around portion 256 do not clamp the webbing 26. Further, even when the plate 248 rotates as described above, the plate 248 and the tongue main body 242 do not clamp the webbing 26, and moreover, in the state in which the restricting portions 264 abut the engaging pieces 246, further rotation of the plate 248 is restricted. Therefore, as described above, even in a state in which increasing of the length of the lap webbing 38 is prevented or suppressed, a large load is not applied locally to the webbing 26.

What is claimed is:

1. A tongue for a seat belt device, comprising:
   a tongue main body that is provided at an intermediate portion of a webbing in a longitudinal direction of the webbing, and at which the webbing is folded over in a state in which the tongue main body is inserted in a buckle;
   a train-around portion that is provided at the tongue main body, and at which the webbing is bent due to the webbing being trained therearound; and
   a bending angle increasing section that includes a movable portion provided so as to be apart from the train-around portion by more than a thickness dimension of the webbing, and that, in a case in which tension of the webbing is a predetermined magnitude or greater, moves the movable portion in a predetermined direction to cause the movable portion to push the webbing, and trains the webbing around the train-around portion and increases a bending angle of the webbing in a state in which the movable portion is apart from the train-around portion by more than the thickness dimension of the webbing,
   wherein the movable portion is a folded over portion at which the webbing is folded over, and the movable portion is a slider member that can slide at the tongue main body.

2. The tongue for a seat belt device of claim 1, further comprising a restricting portion that restricts movement of the movable portion in the predetermined direction by the restricting portion engaging with the movable portion that has moved in the predetermined direction with respect to the tongue main body, at a position at which a gap between the train-around portion and the movable portion is greater than or equal to the thickness dimension of the webbing.

3. The tongue for a seat belt device of claim 1, wherein the bending angle increasing section, in the case in which the tension of the webbing is the predetermined magnitude or greater, moves the movable portion in the predetermined direction such that a portion of the webbing at a side further toward an end side than the folded over portion and a portion of the webbing at a side further toward an opposite end side than the folded over portion approach or contact with each other in the vicinity of the folded over portion.

4. A seat belt device comprising:
   a buckle that is provided at a side of a seat;
   a webbing that is shaped as an elongated strip; and
   a tongue that includes:
   a tongue main body that is provided at an intermediate portion of the webbing in a longitudinal direction of the webbing, and at which the webbing is folded over, the tongue main body being insertable into the buckle;
   a train-around portion that is provided at the tongue main body, and at which the webbing is bent due to the webbing being trained therearound; and
   a bending angle increasing section that includes a movable portion provided so as to be apart from the train-around portion by more than a thickness dimension of the webbing, and that, in a case in which tension of the webbing is a predetermined magnitude or greater, moves the movable portion in a predetermined direction to cause the movable portion to push the webbing, and trains the webbing around the train-around portion and increases a bending angle of the webbing in a state in which the movable portion is apart from the train-around portion by more than the thickness dimension of the webbing, wherein the movable portion is a folded over portion at which the webbing is folded over, and the movable portion is a slider member that can slide at the tongue main body.

5. The seat belt device of claim 4, further comprising a restricting portion that restricts movement of the movable portion in the predetermined direction by the restricting portion engaging with the movable portion that has moved in the predetermined direction with respect to the tongue main body, at a position at which a gap between the train-around portion and the movable portion is greater than or equal to the thickness dimension of the webbing.

6. The seat belt device of claim 4, wherein the bending angle increasing section, in the case in which the tension of the webbing is the predetermined magnitude or greater, moves the movable portion in the predetermined direction such that a portion of the webbing at a side further toward an end side than the folded over portion and a portion of the webbing at a side further toward an opposite end side than the folded over portion approach or contact with each other in the vicinity of the folded over portion.

* * * * *